US009514567B2

(12) United States Patent
Tateishi et al.

(10) Patent No.: US 9,514,567 B2
(45) Date of Patent: Dec. 6, 2016

(54) SCREEN DISPLAY DEVICE, SYSTEM, AND SCREEN GENERATION METHOD DISPLAYING THE STATE OF A NETWORK

(71) Applicant: NIPPON TELEGRAPH AND TELEPHONE CORPORATION, Tokyo (JP)

(72) Inventors: Naoki Tateishi, Tokyo (JP); Mitsuho Tahara, Tokyo (JP); Hikaru Seshake, Tokyo (JP); Taku Kihara, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 93 days.

(21) Appl. No.: 14/416,657

(22) PCT Filed: Jul. 19, 2013

(86) PCT No.: PCT/JP2013/069593
§ 371 (c)(1),
(2) Date: Jan. 23, 2015

(87) PCT Pub. No.: WO2014/017385
PCT Pub. Date: Jan. 30, 2014

(65) Prior Publication Data
US 2015/0178984 A1 Jun. 25, 2015

(30) Foreign Application Priority Data
Jul. 23, 2012 (JP) .................................. 2012-162454

(51) Int. Cl.
*G06T 15/00* (2011.01)
*G06T 17/00* (2006.01)
(Continued)

(52) U.S. Cl.
CPC ............. *G06T 17/00* (2013.01); *G06T 15/005* (2013.01); *H04L 41/065* (2013.01);
(Continued)

(58) Field of Classification Search
CPC ................................. H04L 41/12; H04L 41/06
(Continued)

(56) References Cited

U.S. PATENT DOCUMENTS 5,586,254 A * 12/1996 Kondo ................ H04L 41/0677
370/254
5,751,931 A 5/1998 Cox et al.
(Continued)

FOREIGN PATENT DOCUMENTS

EP 2355409 A1 8/2011
JP 7-312596 A 11/1995
(Continued)

OTHER PUBLICATIONS

Extended European Search Report for corresponding EP application No. EP 13 82 3167, mailing date of Feb. 10, 2016 (3 pages).
(Continued)

*Primary Examiner* — Thomas Lett
(74) *Attorney, Agent, or Firm* — Capitol City TechLaw, PLLC; Samuel P. Burkholder

(57) ABSTRACT

A screen display device (200) displays a three-dimensional display screen on which network (NW) devices, links, paths, obstruction points (alarms) are displayed on a map representation. The screen display device (200) defines rungs on the basis of attributes of the devices so that a device of a lower rung (a terminal device in the NW) is placed at a lower position while a device of a higher rung is placed at a higher position on the three-dimensional display screen. Further, for an area where devices are on multiple rungs, the screen display device (200) displays a mark at the area to make the
(Continued)

rung height of each device more recognizable. Also, the screen display device (200) provides an indication enclosing devices that form an active system/backup system pair to make it easy to understand whether there is a system that remains normal so that service can be offered.

11 Claims, 23 Drawing Sheets

(51) Int. Cl.
*H04L 12/24* (2006.01)
*H04L 12/26* (2006.01)

(52) U.S. Cl.
CPC ........ *H04L 41/069* (2013.01); *H04L 41/0677* (2013.01); *H04L 41/12* (2013.01); *H04L 41/22* (2013.01); *H04L 43/026* (2013.01); *H04L 43/0894* (2013.01)

(58) Field of Classification Search
USPC ......................................................... 345/419
See application file for complete search history.

(56) References Cited

U.S. PATENT DOCUMENTS

| | | | |
|---|---|---|---|
| 6,040,834 A * | 3/2000 | Jain | ................. H04L 41/06 709/223 |
| 6,271,845 B1 * | 8/2001 | Richardson | ......... H04L 41/0893 715/764 |
| 7,502,854 B2 * | 3/2009 | Luo | ................. H04L 41/06 709/224 |
| 7,782,773 B2 | 8/2010 | Gous | |
| 2004/0019676 A1 | 1/2004 | Iwatsuki et al. | |
| 2007/0047542 A1 * | 3/2007 | Thukral | ............ H04L 29/06027 370/389 |
| 2008/0263150 A1 * | 10/2008 | Childers | ............. H04L 41/0853 709/203 |
| 2010/0110932 A1 | 5/2010 | Doran et al. | |

FOREIGN PATENT DOCUMENTS

| | | |
|---|---|---|
| JP | 8-305525 A | 11/1996 |
| JP | 2004-56604 A | 2/2004 |
| JP | 2006-503506 A | 1/2006 |
| JP | 2011-160324 A | 8/2011 |

OTHER PUBLICATIONS

International Search Report for corresponding PCT/JP2013/069593 application dated Oct. 22, 2013 (4 pages).
Toyo Corporation, "Route Explorer/Traffic Explorer," from http://www.toyo.jp/packetdesign, located on Jul. 23, 2012, and partial English translation (3 pages).
International Telecommunication Union, "Data Oriented Human-Machine Interface Specification Technique—Scope, Approach and Reference Model, ITU-T Recommendation Z.352," Mar. 1993, ITU.
International Telecommunication Union, "Design Guidelines for Human-Computer Interfaces (HCI) for the Management of Telecommunications Networks, ITU-T Recommendation Z.361," Feb. 1999, ITU.
International Telecommunication Union, "Graphic Information for Telecommunication Management Objects, ITU-T Recommendation Z.371," Apr. 2005, ITU.
International Telecommunication Union, "Templates for Telecommunications Human-Machine Interfaces, ITU-T Recommendation Z.372," Apr. 2005, ITU.

* cited by examiner

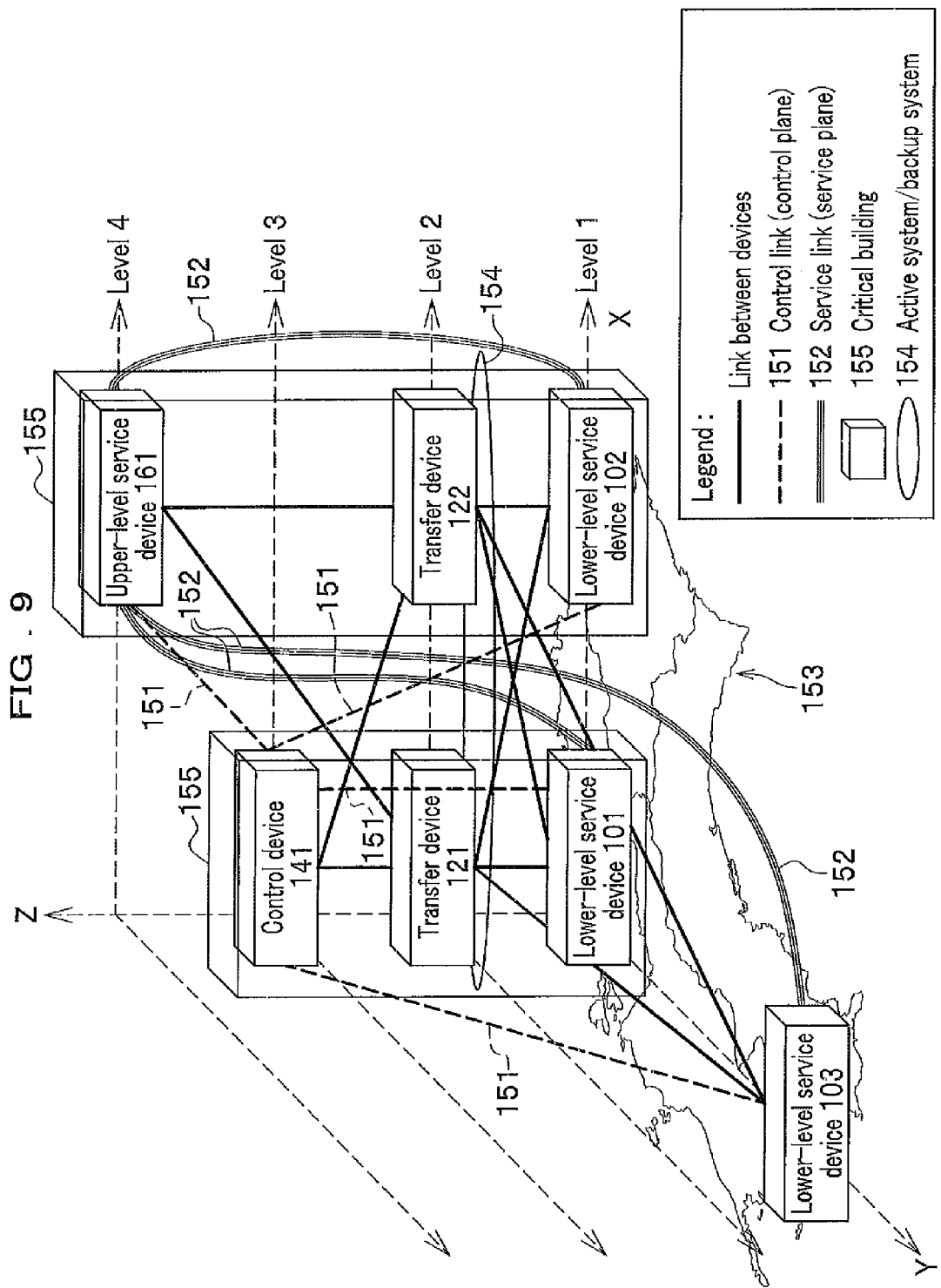

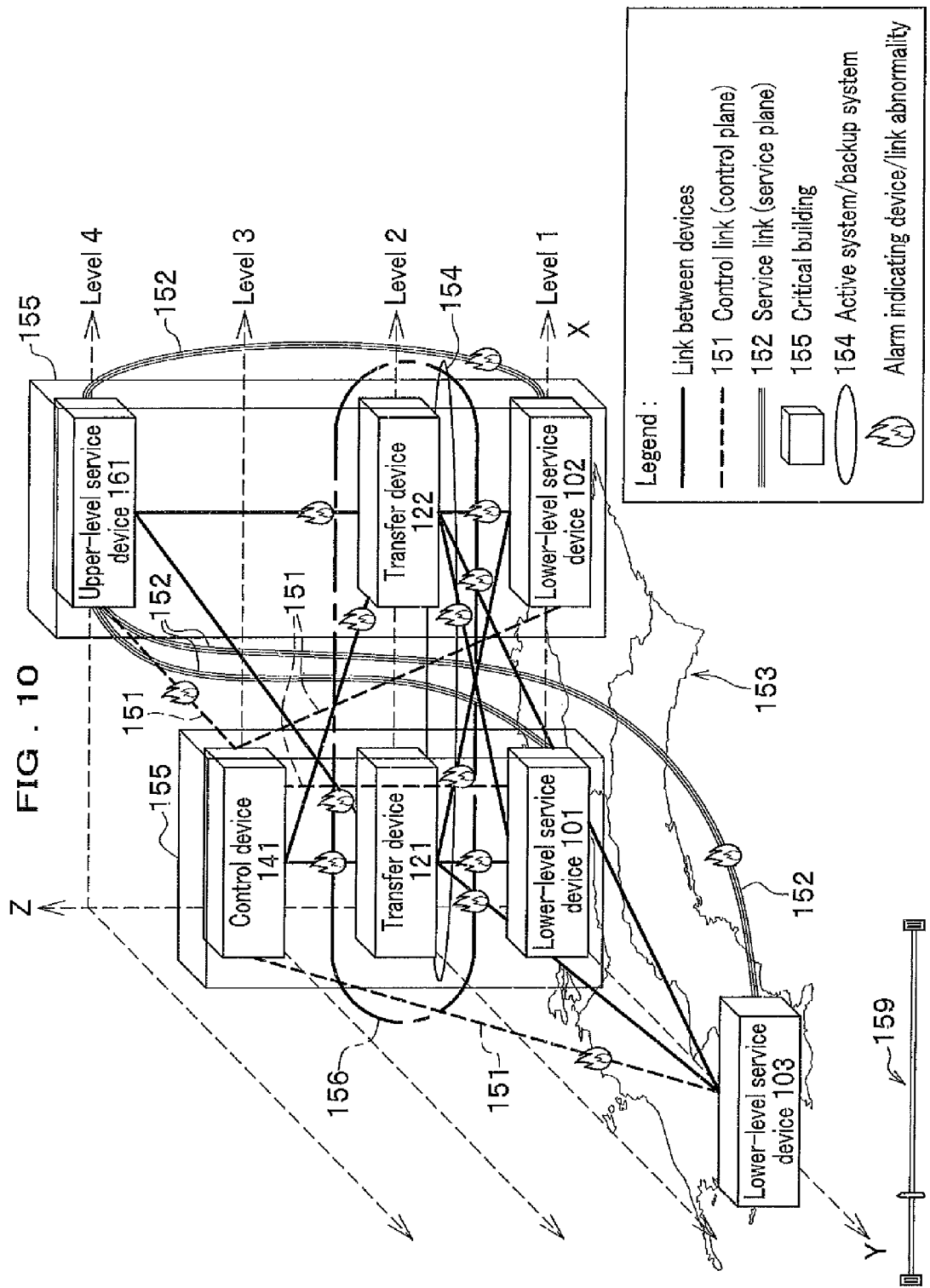

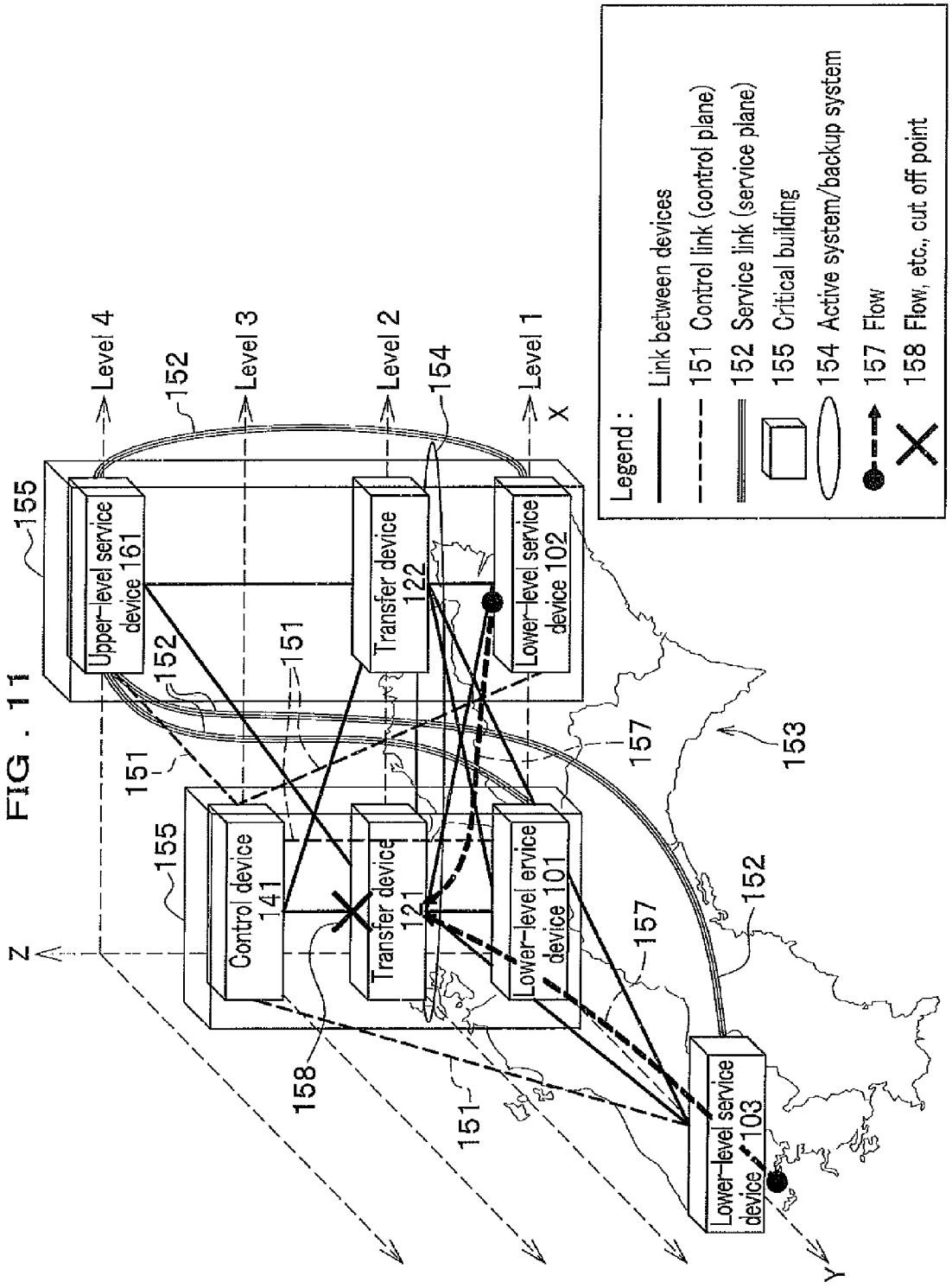

FIG. 13

Device attribute information

| Device number | Device name | Rung | Rung number | Latitude, longitude | Multiple-system device |
|---|---|---|---|---|---|
| 101 | Lower-level service device 101 | Lower-level service | 1 | 33.4, 130.0 | |
| 121 | Transfer device 121 | Transfer | 10 | 35.8, 140.1 | Transfer device 122 |

Inter-device connection (link) information

◇Connection relationship information 1 (physical link information)

| Link number | Device number | Device name | Device number | Device name |
|---|---|---|---|---|
| L-F221 | 101 | Lower-level service device 101 | 121 | Transfer device 121 |

◇Connection relationship information 2 (control plane)

| Link number | Device number | Device name | Device number | Device name |
|---|---|---|---|---|
| L-C241 | 101 | Lower-level service device 101 | 141 | Transfer 141 |

◇Connection relationship information 3 (service plane)

| Link number | Device number | Device name | Device number | Device name |
|---|---|---|---|---|
| L-S261 | 101 | Lower-level service device 101 | 161 | Upper-level service device 161 |

Setting information

◇Attribute-level setting information

| Setting number | Rung | Rung number | Displayed level |
|---|---|---|---|
| 901 | Lower-level service | 1 | 1 |
| 902 | Transfer | 10 | 2 |

◇Level-coordinate setting information

| Displayed level | Height coordinate |
|---|---|
| 1 | 0 |
| 2 | 20 |

◇Critical-building information

| Building name | Latitude, longitude |
|---|---|
| Niihama | 33.5, 133.0 |
| Tokushima | 34.0, 134.3 |

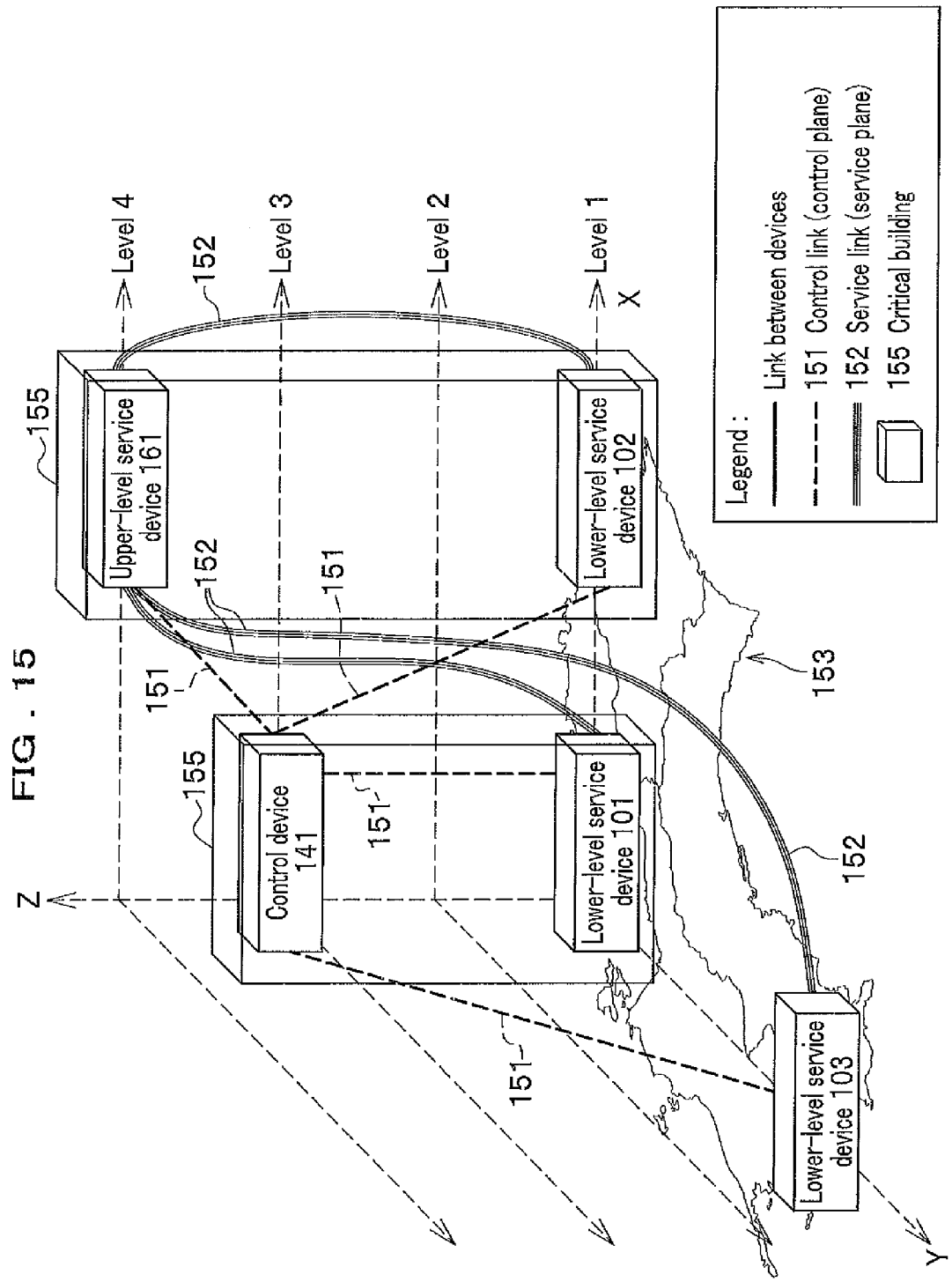

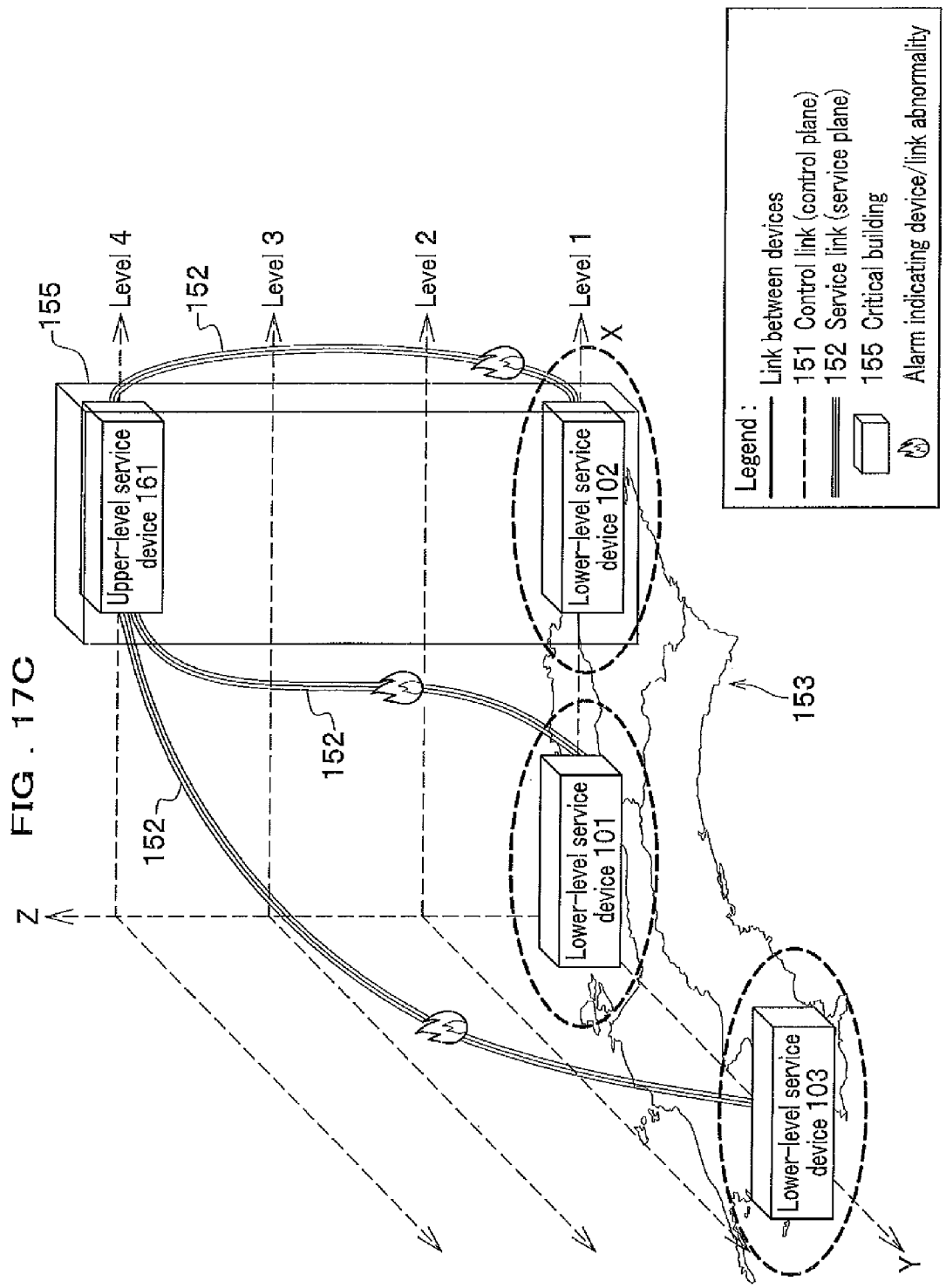

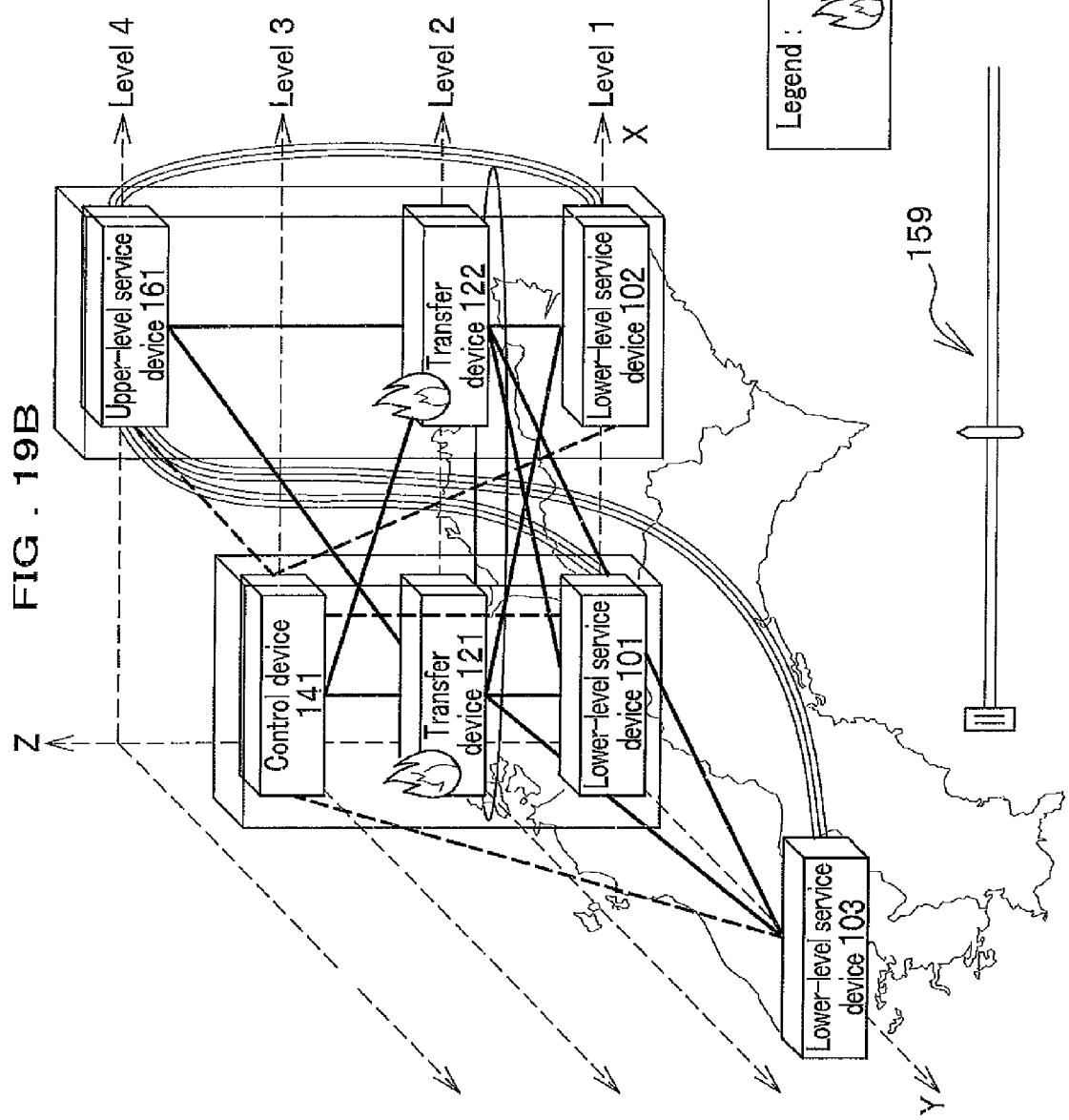

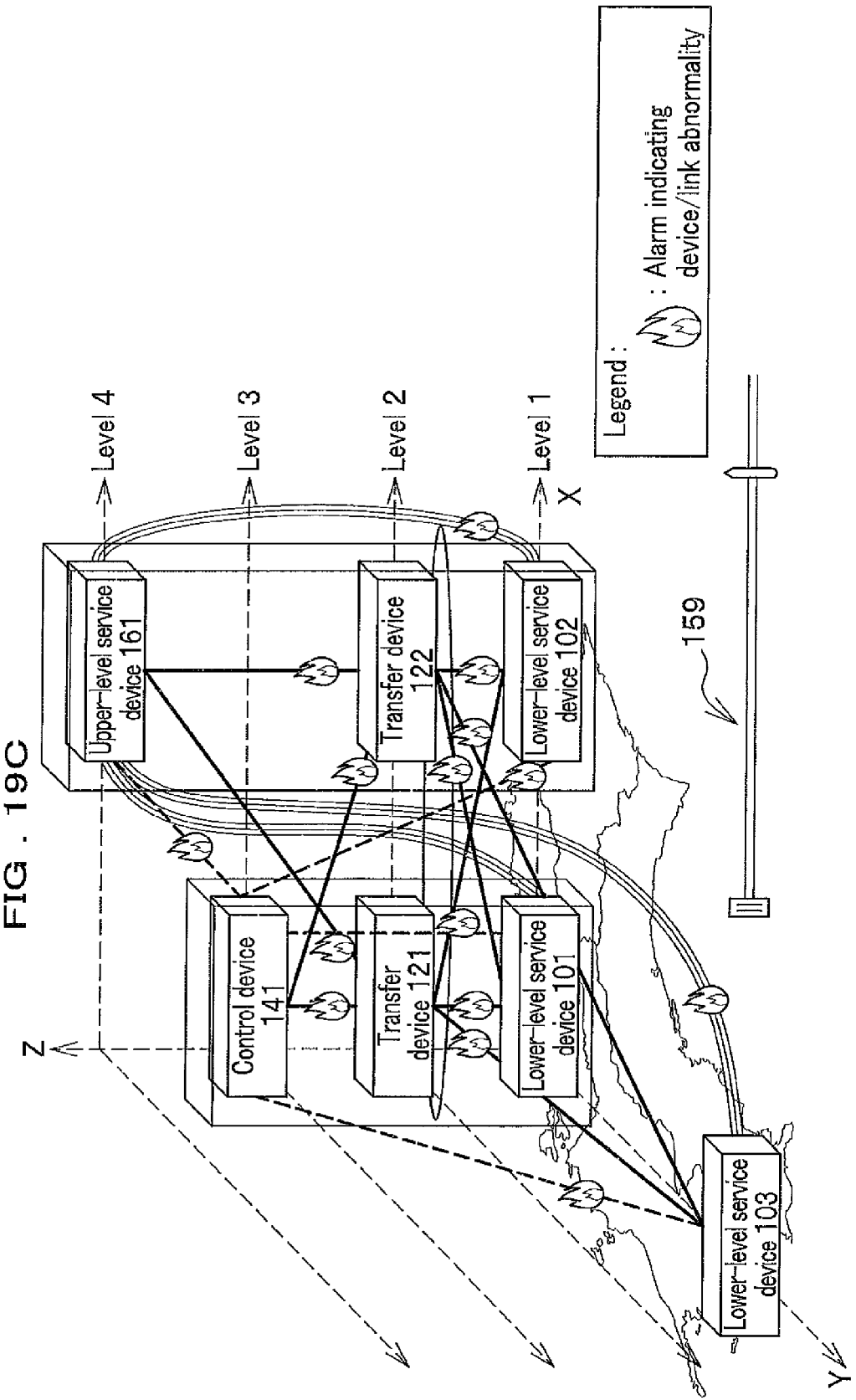

SCREEN DISPLAY DEVICE, SYSTEM, AND SCREEN GENERATION METHOD DISPLAYING THE STATE OF A NETWORK

TECHNICAL FIELD

The present invention relates to: a screen display device that displays a state of a network; a system; and a screen display method.

BACKGROUND ART

Telecommunication enterprise networks use various devices such as transfer devices and control devices. Examples of methods for representing a network configuration include a method of depicting devices at particular positions on a map using information about their geographical positions (FIG. 1; see "ITU-T Z. 371" of Nonpatent Document 1). In the following description on prior art techniques and on an embodiment of the present invention, the assumption is made that devices in a network are linked in a connection relationship shown in FIG. 1. The method of depicting devices at particular positions of a map using information about their geographical positions is described on the assumption that a network is composed of: an upper-level service device 161 embodied by, for example, a server; lower-level service devices 101, 102, 103 that are terminal devices in the network; transfer devices 121, 122 that perform data transfer; and a control device 141 that controls operation of the transfer devices 121, 122 and lower-level service devices 101-103. The devices are linked in a connection relationship shown in FIG. 1. This method is advantageous in that it produces displays that allow viewers of the screen to readily understand the positions of each device and the geographical area that the device covers.

Among other methods for representing a network configuration is a method based solely on a logical connection relationship among devices without giving any consideration to their geographical information (see FIG. 2; see "ITU-T Z. 371" of Nonpatent Document 1). In FIG. 2, the symbol □ represents a device, and a line between devices represents a link. Further, as a method stemming from this method, there is a method in which, of devices in a network, devices of a same function and same role are placed on a same level (see FIG. 3). In this method, the levels are defined based on the number of devices (number of hops) that data is required to pass through to reach an uppermost device after leaving a level having network terminal devices (indicated by the broken line in FIG. 3) as the lowermost level, and this series of levels is defined as "rungs". Further, this method lets a screen display device display all devices and all rungs on a screen with devices of a same function and same role placed in an organized manner on a same level. This method illustrated in FIG. 3 is advantageous in that it produces displays which allow the viewer to more easily comprehend on the screen the function and role of each device and the logical configuration of the network.

The screen display methods in FIGS. 1-3, instead of displaying the whole network, may cut out and display only a portion of the network. For how to cut out a portion, mention may be made of cutting out only the configuration of a part of devices and their vicinity, only the configuration of devices in a given area, only a group of devices or rungs having a particular function, or rungs related to a particular service (see Nonpatent Document 2, FIGS. 4 and 5). As an example of cutting out a group of devices having a particular function, mention may be made of cutting out only rungs for a group of devices having a particular control-system function (a control plane). FIG. 4A illustrates connections among the rungs in the network of FIG. 3. FIG. 4B is after the control plane is cut out of the network representation of FIG. 4A. Of the devices in FIG. 4A, FIG. 4B shows only those that are cut out, namely, the control device 141 and the service devices (the upper-level service device 161 and the lower-level service devices 101-103), excluding the transfer devices 121, 122. Note that physically there are transfer devices and transfer links in-between the devices belonging to the control plane. In the display method of FIG. 4B, in order to make it easy to see how the control-system devices are mutually connected, the physical connections with the transfer devices 121, 122 and transfer links between devices are abstracted and represented by control links (in FIG. 4B, represented by the straight broken line). This allows the viewer to more easily understand how the control-system function is effected between devices, on the screen.

As an example of cutting out only rungs related to a particular service, mention may be made of cutting out only rungs of a service plane. FIG. 5A illustrates connections among the rungs in the network of FIG. 3. FIG. 5B is after the service plane is cut out of the network representation shown in FIG. 5A. Of the devices in FIG. 5A, FIG. 5B shows only those that are cut out, namely, the service devices (the upper-level service device 161 and the lower-level service devices 101-103). Note that there are the transfer devices 121, 122 and transfer links in-between these devices and that the transfer devices 121, 122 and the control device 141 belonging to the service plane operate in cooperation to realize the service. In this display method, however, the configurations of the transfer devices 121, 122 and the control device 141 in-between the service-system devices are abstracted and represented by service links 152. This allows the viewer to more easily understand how the service is offered between devices, on the screen.

In a network obstruction (abnormality), it is required: to check whether devices on each rung operate normally; to identify a device that has caused the obstruction; to check whether the abnormality of a given device has caused any impact on other devices; and to grasp the area and number of users affected by the obstruction (hereinafter referred to all together as the extent of obstruction).

Under these circumstances, methods are proposed to clearly indicate to the viewer a relevant area in cases where an alarm of any sort is issued from a device, a link, etc., in a network or where an abnormality is suspected because of absence of response from a device, by superimposing additional marks onto the devices or links or changing the color thereof on the display screen, as illustrated in FIG. 6.

RELATED ART DOCUMENTS

Nonpatent Documents

Nonpatent Document 1: ITU-T Z.352, Z.361, Z.371, Z.372 [online], [searched on Jul. 23, 2012], on the Internet, <URL: http://www.itu.int/ITU-T/>

Nonpatent Document 2: Route Explorer, [online], [searched on Jul. 23, 2012], on the Internet, <URL:http://www.toyo-.co.jp/packetdesign/>

SUMMARY OF THE INVENTION

Problem to be Solved by the Invention

The above-mentioned techniques have the following problems. First, while the plan representation method based on the geographical configuration and the representation method based solely on the logical connection relationship among devices illustrated in FIGS. 1 and 2 respectively enable inferring the extent of obstruction, those methods have difficulties showing the rung configuration, which makes the display screen viewer unable to tell whether a device with an abnormality is a critical device or a terminal device, at a glance on the screen, as shown in FIG. 6.

Further, alarm displays may be added to the method of representing in a plan all the connections among the rungs illustrated in FIG. 3 (see FIG. 7). This method, however, while representing all the connections among the devices, fails to show the geographical relationship among the devices, making it difficult to interpret the extent of obstruction. Also, in FIG. 7 illustrating an example of a display screen showing that an obstruction caused by the transfer devices 121, 122 affects a large number of devices across a multiple rungs (a telecommunication obstruction), the display screen viewer has difficulties understanding which rung has caused the abnormality, on the screen.

Further, in the methods of cutting out only a part of devices of a network illustrated in FIGS. 4A-5B, alarm displays may be added to the cut out display screen. For example, FIG. 8A illustrates an example where alarm displays are added to the display screen of FIG. 4B. FIG. 8B illustrates an example where alarm displays are added to the display screen of FIG. 5B. In these cases, it is easy for the display screen viewer to recognize an obstruction caused on the cut-out plane while in cases where the obstruction spreads to a plurality of planes such as a case where the obstruction caused by the transfer devices 121, 122 in the network of FIG. 4A affects devices on other rungs, it is difficult to identify which rung or area has caused the obstruction. For example, in a case where the obstruction caused by the transfer devices 121, 122 in the network affects devices on other rungs, alarms are superimposed on the control links 151 in the display screen of FIG. 8A while on the control plane, there are no devices that have caused the obstruction. In the display screen of FIG. 8B, alarms are superimposed on the service links 152 while on the service plane, there are no devices that have caused the obstruction. In these cases, the viewer of the screen display device is required to switch to the screens on which all devices and all rungs are displayed in order to see where the obstruction source is. This method also has a problem that the extent of obstruction is difficult to determine since it fails to provide the geographical context.

As described above, when the obstruction occurs, the viewer has no choice but to operate the screen display device and switch various screens from one to another in order to grasp which rung or device has caused the obstruction, which is a complicated procedure.

Moreover, none of the above-described methods produces a display of the relationship between devices that form a multiple-system group such as an active system/backup system group, on the display screen. Accordingly, in a case where the obstruction involves a plurality of devices, the viewer has difficulties determining whether all the systems of the multiple-system group are broken so that service cannot be offered or even one system remains normal so that service can be offered, on the screen.

Further, in a case where multiple obstructions occur or in a case where a single obstruction affects a plurality of rungs or devices, it is important to go back along the time axis to grasp the origin and propagation condition of the obstruction in order to determine a rung that has caused the obstruction and the source of obstruction, and especially a location where the obstruction has first occurred. In the prior art representation methods, however, it is difficult for the viewer to grasp the occurrence of the obstruction and changes in propagation over time, on the screen, because it is only a state of the network at a given time that is shown.

With this being a situation, it is an object of the present invention to provide a screen display device and the like that, when a network obstruction occurs, allow the viewer of the screen display device to more easily grasp obstruction points, the source of obstruction, the rungs, the extent of obstruction, and the like, on the screen.

Means for Solving the Problem

To solve the above problems, the present invention has been made. It is an object of the present invention to provide a screen display device configured to generate a screen that shows a state of a network. The screen display device comprises: a storage part; an input/output par; and a processing part. The storage part configured to store each item of: (1) device attribute information; (2) inter-device connection information; (3) setting information; (4) analyzed flow information; and (5) alarm information, together with its time information. The device attribute information (1) indicates: information indicative of which one of attributes below is an attribute of each of a plurality of devices that form a network; coordinates of the device relative to a map; and, if the device as a first device and a second device which is another one of the plurality of devices form a pair of an active system/backup system, the second device. The attributes are: a terminal device of the network; a server device; a transfer device; and a control device. The server device is configured to transmit to and receive from the terminal device various kinds of data. The transfer device is configured to transfer the data between the server device and the terminal device. The control device is configured to control the transfer device and the terminal device. The inter-device connection information (2) indicates a connection relationship among the plurality of devices. The setting information (3) indicates: a rung corresponding to each attribute; and a coordinate defining a height of a device belonging to each rung relative to a three-dimensional display screen. The analyzed flow information (4) indicates devices traversed by each of a plurality of flows of the network. The alarm information (5) indicates alarms to be displayed respectively on devices of the network and for links between devices. The input/output part is configured to receive a selective input of a display time that gives instructions that a network state at which time should be displayed and to output to the display device a three-dimensional display screen displaying the network state. The three-dimensional display screen is generated by a processing part. The processing part is configured to generate the three-dimensional display screen.

The processing part: refers to the inter-device connection information to determine a connection relationship among the plurality of devices that is at the selectively inputted display time; refers to the device attribute information and the setting information to determine coordinates of each of the plurality of devices relative to an xy plane and a coordinate thereof relative to a z axis of the three-dimensional display screen that are at the selectively inputted display time, and places each of the plurality of devices at the determined coordinates of the three-dimensional display screen; refers to the device attribute information and, if at the selectively inputted display time, there is the second device paired with the device, places the pair on the three-dimensional display screen together with an indication showing that the devices are a pair; refers to the alarm information and, if there are devices and links targeted selectively for alarms at the inputted display time, places the alarms near the devices and links for which the alarms are issued; refers to the analyzed flow information to determine flows that are at the selectively input display time, and places each flow on a link of the three-dimensional display screen that is traversed by the flow, and generates a three-dimensional display screen. On this three-dimensional display screen, there are superimposed and placed: the plurality of devices; the plurality of links between the plurality of devices; the flows that traverse the links; and the alarm information on the devices and links.

Further, there is provided system comprising: the above-disclosed screen display device; and a plurality of devices that form a network. The plurality of devices are configured to transmit to and receive from the screen display device source data for the alarm information and of the analyzed flow information.

The above screen display device varies the indication of the height of a device according to on which rung the device is displayed on the three-dimensional display screen. This allows the screen viewer to understand at a glance on which rung a device with an abnormality is located and thus more easily grasp the criticality of an obstruction. Also since the screen display device shows a relationship among the devices about their geographical positions, the viewer can more easily understand the extent of obstruction. Further, the screen display device shows a group of devices that form an active system/backup system pair on the three-dimensional display screen so that when an obstruction occurs, the viewer can more readily tell whether or not even one system can offer service. Moreover, the screen display device displays a state of the network that is at any time chosen by the viewer so that it is easier for the viewer to grasp the occurrence of the obstruction and changes in the propagation thereof over time on the screen.

Further, the coordinate defining a height of a device belonging to each rung in the setting information is set so that the closer to a terminal of the network the attribute of the device is, the smaller a value is assumed by the coordinate defining the height of the device.

With the above-described configuration of the screen display device, as the device is closer to a terminal of the network, the device is displayed at a lower position on the three-dimensional display screen. Accordingly, the screen viewer can tell at a glance whether or not a device with an abnormality is a device close to the terminal of the network.

Moreover, the processing part generates time-series three-dimensional display screens spanning from the selectively input display time to a predetermined time and displays sequentially the generated three-dimensional display screens via the input/output part.

This allows the screen viewer of the screen display device to further more easily grasp the occurrence of the obstruction and changes in the propagation thereof over time on the screen.

Further, the processing part generates a three-dimensional display screen in which adjustments are made to reduce crossing of the devices, links, flows, and alarm information placed thereon.

This allows the screen viewer of the screen display device to further more easily grasp obstruction points, the source of obstruction, the rungs, the extent of obstruction, and the like, on the screen.

Moreover, when the processing part receives via the input/output part a selective input of a viewpoint and of a direction from which to view the three-dimensional display screen, the processing part generates a three-dimensional display screen viewed from the selected viewpoint and direction.

This allows the screen viewer of the screen display device to further more easily grasp obstruction points, the source of obstruction, the rungs, the extent of obstruction, and the like, on the screen.

Advantageous Effects of the Invention

According to the present invention, the information on the network composed of the multiple rungs and the alarm information is shown on the three-dimensional display screen so that the screen viewer can more easily grasp obstruction points, the source of obstruction, the rungs, the extent of obstruction, and the like.

BRIEF DESCRIPTION OF THE DRAWINGS

FIG. 9 is a view illustrating an example of a display screen according to an embodiment of the present invention.

FIG. 10 is a view illustrating an example of a display screen when an obstruction occurs according to the embodiment.

FIG. 11 is a view illustrating another example of the display screen when an obstruction occurs according to the embodiment.

FIG. 13 is a view illustrating an example of device attribute information, inter-device connection information, and setting information.

FIG. 15 is a view illustrating an example of a display screen on which only items on control and service are displayed and links between devices and transfer devices are hidden, according to the embodiment.

FIG. 17C is a view illustrating an example of a display screen with information thereon narrowed to service-plane related devices and links and with alarms also shown thereon.

FIG. 19B is a view illustrating an example of a display screen that displays the next state in the past chosen by the time-base bar.

FIG. 19C is a view illustrating an example of a display screen that displays the current state chosen by the time-base bar.

EMBODIMENT FOR CARRYING OUT THE INVENTION

Figure 1:
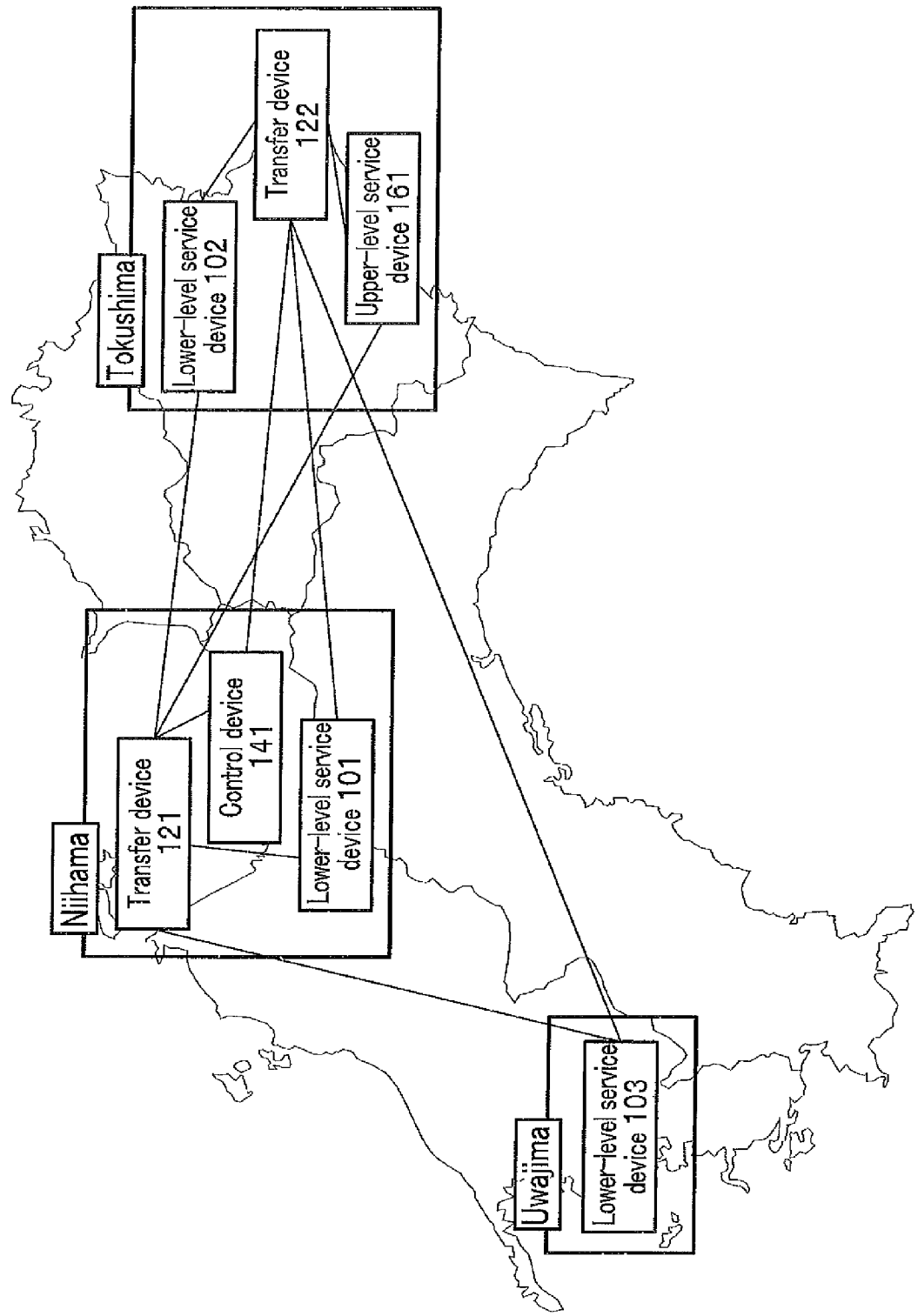
FIG. 1 illustrates an example where a state of a NW is represented based on the geographical configuration thereof.
Figure 2:
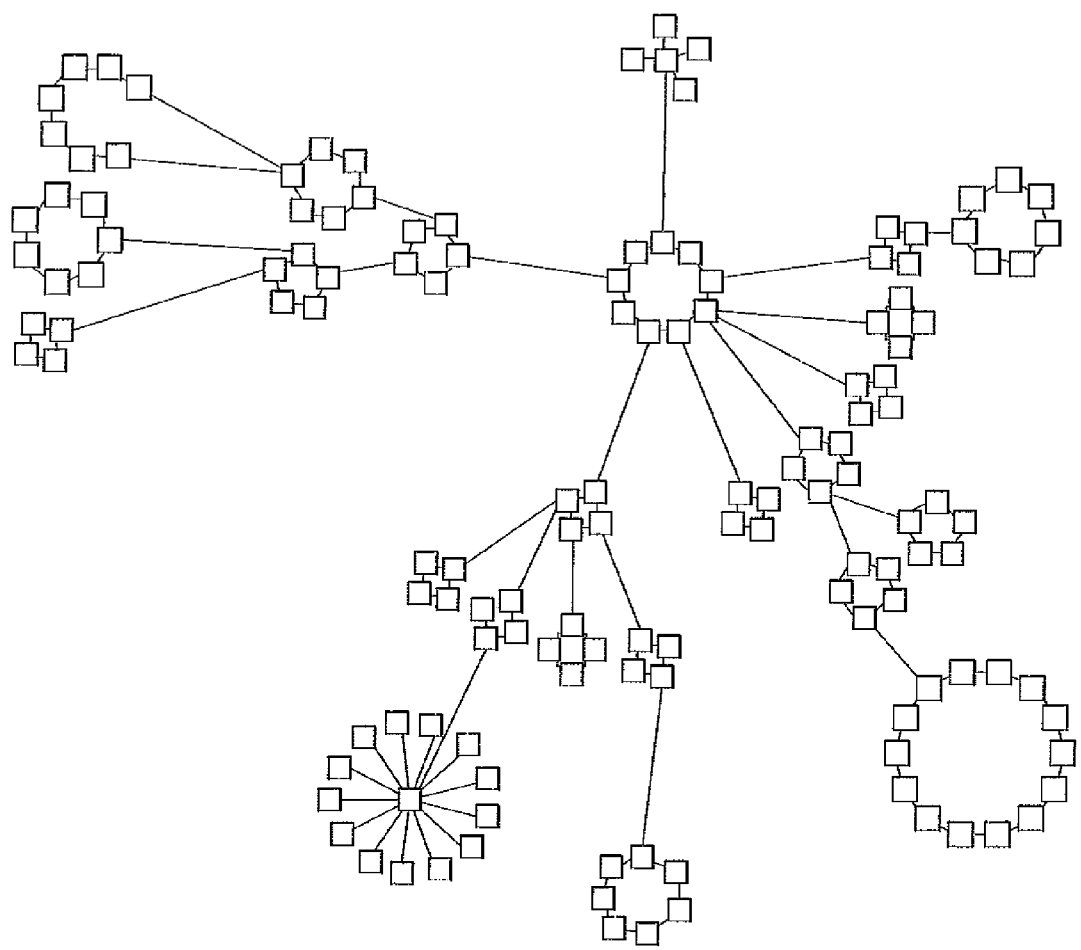
FIG. 2 illustrates an example where the state of the NW is represented based on the logical topology thereof.
Figure 3:
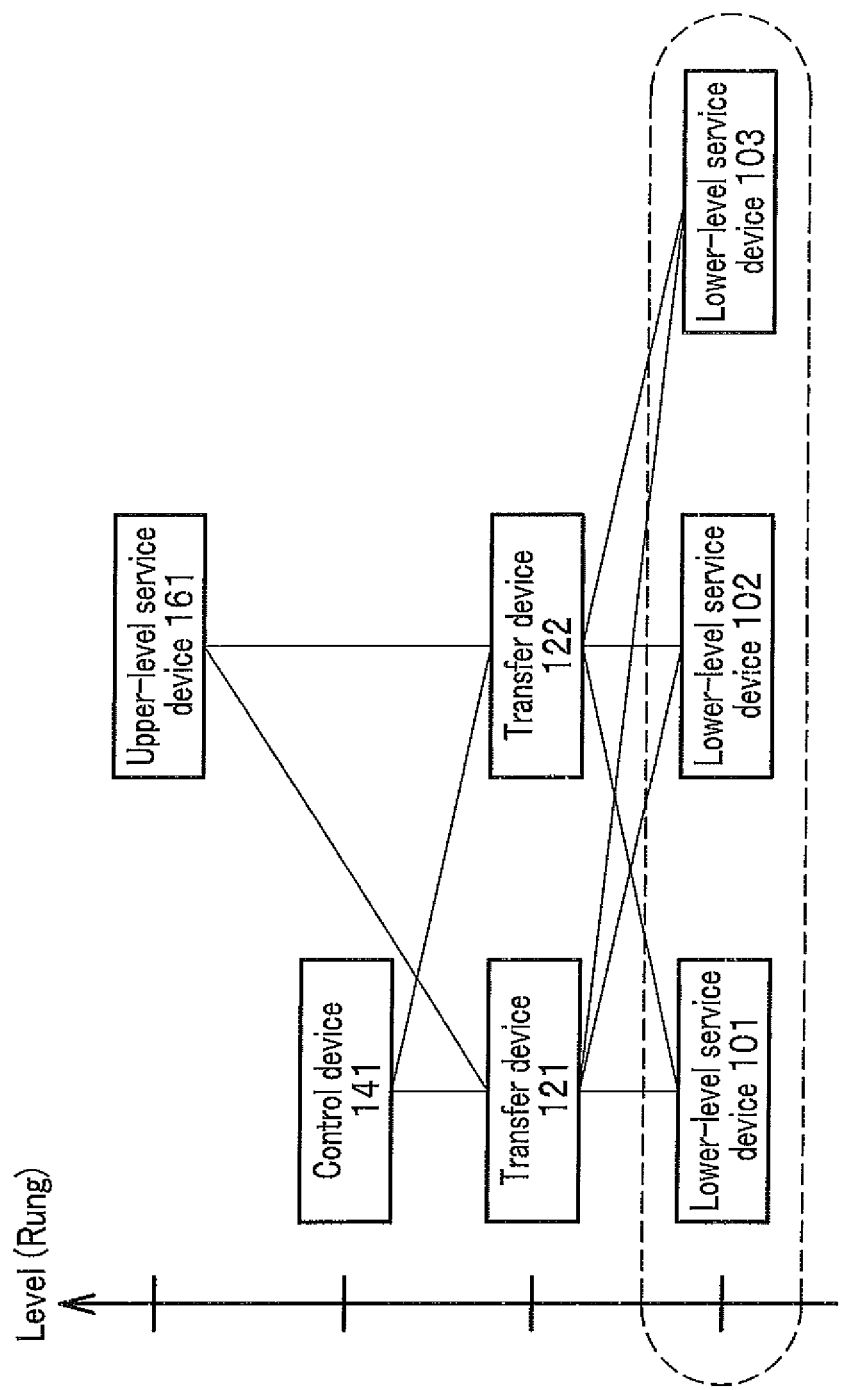
FIG. 3 illustrates an example where all connections among rungs in the NW are shown at once.
Figure 4A:
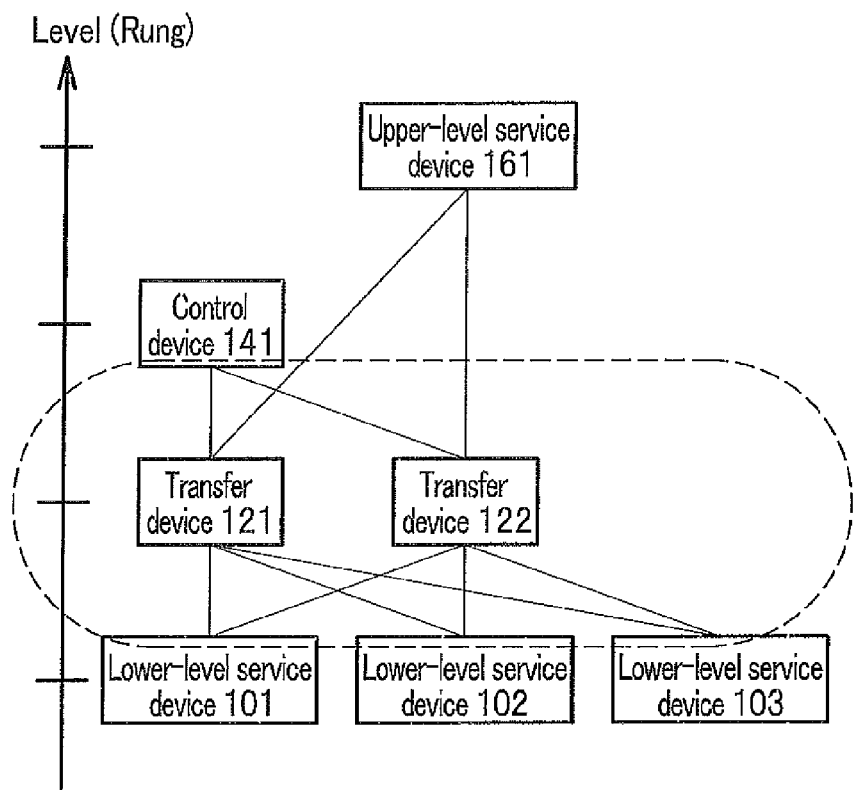
FIG. 4A illustrates the example of the connections among the rungs in the network shown FIG. 3.
Figure 4B:
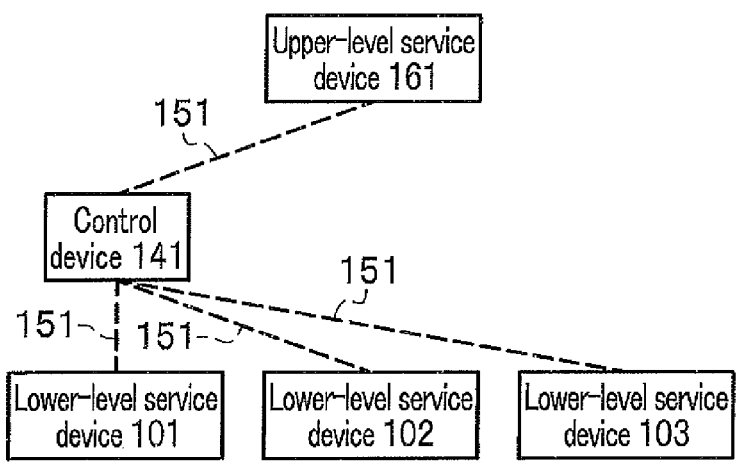
FIG. 4B illustrates an example where the physical connections with transfer devices and transfer links between devices in FIG. 4A are abstracted and represented by control links.
Figure 5A:
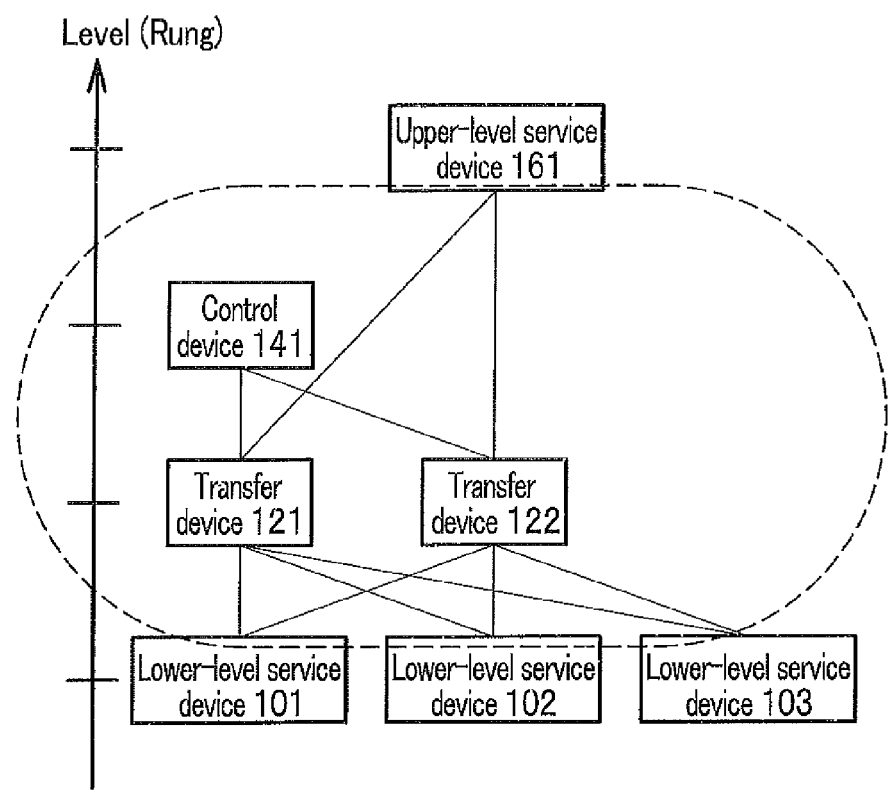
FIG. 5A illustrates the example of the connections among the rungs in the network shown FIG. 3.
Figure 5B:
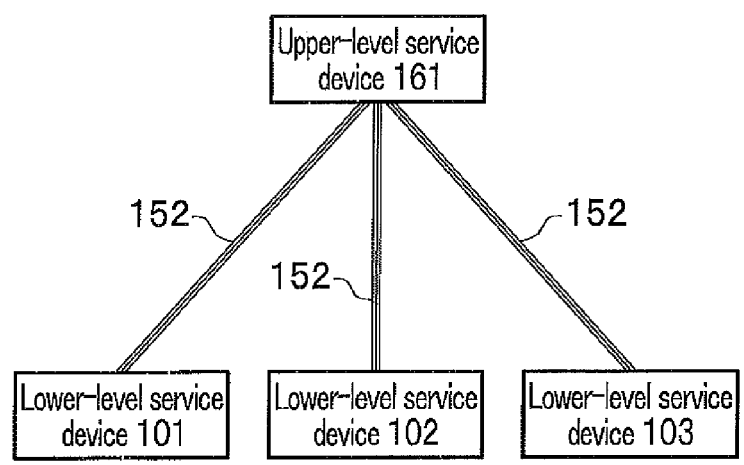
FIG. 5B illustrates an example where components such as the transfer devices and a control device between service-system devices in FIG. 5A are abstracted and represented by service links.
Figure 6:
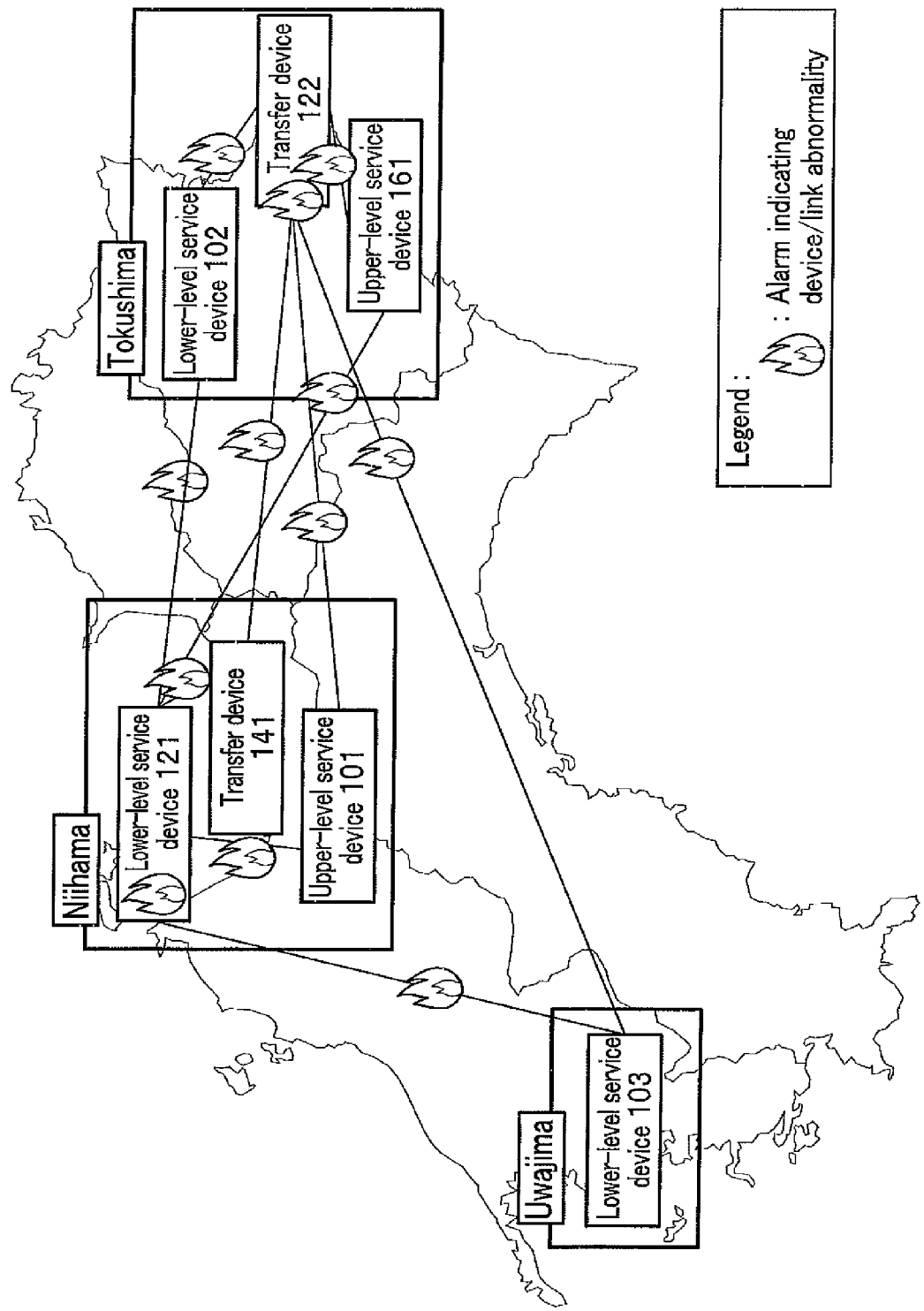
FIG. 6 illustrates another example where the state of the NW is represented based on the geographical configuration thereof.
Figure 7:
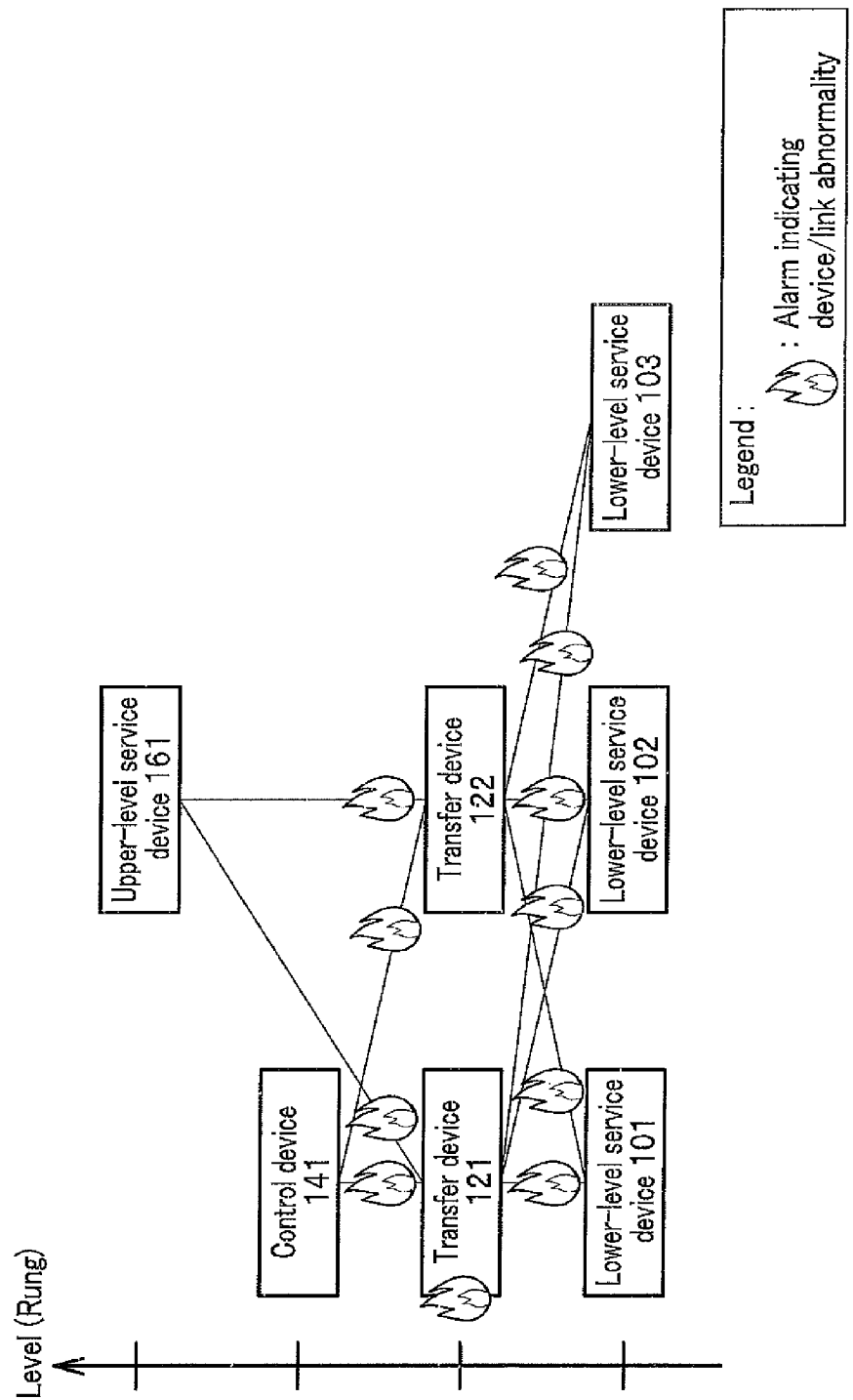
FIG. 7 illustrates an example where alarms are also displayed in the representation method of FIG. 3.
Figure 8A:
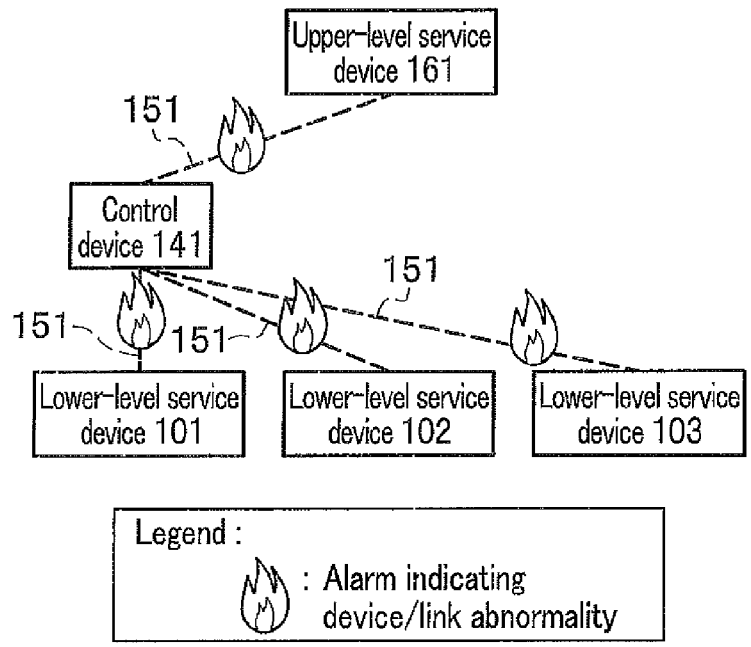
FIG. 8A illustrates an example where alarms are also displayed on the display screen of FIG. 4B.
Figure 8B:
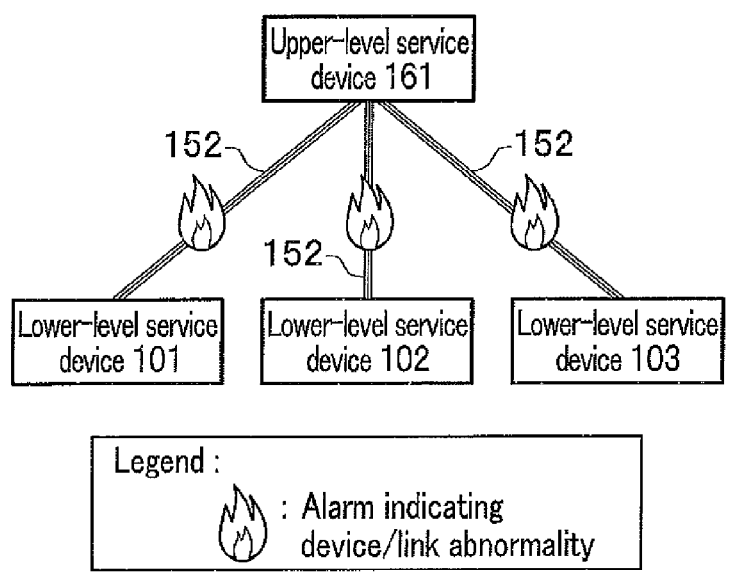
FIG. 8B illustrates an example where alarms are also displayed on the display screen of FIG. 5B.

An embodiment of the present invention will now be described with reference to FIGS. 9 to 19C. As shown in FIG. 9, a network (NW) includes: an upper-level service device 161 embodied by, for example, a server; lower-level service devices 101, 102, 103 that are terminal devices in the NW; transfer devices 121, 122 that perform data transfer between devices; and a control device 141 that controls the transfer devices 121, 122 and lower-level service devices 101-103. These devices are linked in a relationship shown in FIG. 9. In addition, although display screens illustrated below contain x, y, and x axes, these axes are just for explanation of a three dimensional space and may be omitted.

As illustrated in FIG. 9, a screen display device 200 according to the present embodiment (to be described in greater detail below with reference to FIG. 12) displays on a three-dimensional display screen: rungs of all devices in a NW; a connection relationship among the devices; and a group of devices that form an active system/backup system pair. Further, the screen display device 200 displays alarm information on the three-dimensional display screen, when an obstruction occurs (see FIG. 10). Here, a display screen generated by the screen display device 200 is briefly described and then the configuration of the screen display device 200 and the processing steps thereof are explained with reference to FIGS. 12-14.

The screen display device 200 superimposes a map on an xy plane in a three dimensional space represented by the x, y, and z axes, as illustrated in FIG. 9. Then, the screen display device 200 depicts the positions of the devices on the map using information about their geographical positions such as latitudes and longitudes. This allows one who views a screen of the screen display device 200 to more readily infer which areas are affected by the obstruction that has occurred and how many users are affected, on the screen. Further, the screen display device 200 connects together devices that are connected in the network, by lines (links), on the basis of inter-device connection information (to be described in greater detail below with reference to FIG. 13). This allows the viewer to understand a connection relationship among the devices and thereby more readily infer the extent of an obstruction, if any, on the screen. Moreover, the screen display device 200 displays: links between devices; control links 151 (links on a control plane); and service links 152 (links on a service plane), in a distinctive manner. For example, as shown in FIG. 9, the screen display device 200 uses the solid line to indicate the links between devices, the broken line to indicate the links on the control plane, and the triplet to indicate the links on the service plane. This allows the connection relationship among the devices to be easily understood by the viewer in terms of plane.

Further, the screen display device 200 depicts an attribute of each device as a rung by using the z axis (height) of the three dimensional space, on the screen. Attributes as used herein are those obtained by classifying each device into one of an upper-level service device, a lower-level service device, a transfer device, and a control device. In the example of FIG. 9, the rung of the upper-level service device 161 is an uppermost rung, that of the lower-level service devices 101-103 is a lowermost rung, that of the transfer devices 121, 122 is a second lowermost rung, and that of the control device 141 is a third lowermost rung.

The screen display device 200 places devices of the same rung (attribute) on the xy plane at the same height and places devices of different rungs on the xy plane at different heights, on the screen. For example, as shown in FIG. 9, the rungs to which the devices belong may be positioned on the xy plane at the heights of level 1 to level 4. This allows the viewer to more easily understand to which rung (attribute) a device with an abnormality belongs, on the screen, when an obstruction occurs. Further, regarding an area where a device is on a rung above the lowermost rung, the screen display device 200 may be configured to show the area with a mark (a cube, a scale, etc.) to indicate the height of the device located on the higher rung at the area, on the screen. For example, as shown in FIG. 9, regarding an area where devices are on rungs above the lowermost rung (a lower-level service device 102, a transfer device 122, and the upper-level service device 161), the screen display device 200 may enclose the devices all together with a cube as an indication that these devices are a critical building 155. This allows the viewer to more easily recognize the rung of each device.

Moreover, the screen display device 200 superimposes obstruction alarms issued for devices and links, on the three-dimensional display screen, as illustrated in FIG. 10. For example when an obstruction occurs to a given device in the NW and spreads to its subordinate devices and lines, the screen display device 200 displays alarm information on and around the device that is the cause of the obstruction, on the three-dimensional display screen. This allows the viewer to more readily understand where the source of obstruction is, on the display screen. Further, regarding a group of devices that form an active system/backup system group, the screen display device 200 highlights the group by enclosing the devices with a line. For example, the screen display device 200 may enclose devices of the same group with an ellipse 154 as shown in FIGS. 9 and 10. This allows the viewer to more easily recognize devices that form an active system/backup system group, on the screen, and thereby more readily infer to which extent a service is affected by an obstruction that has occurred to a given device.

For example, FIG. 10 shows an example where devices that form an active system/backup system group (the transfer devices 121, 122), as shown enclosed with the long dashed short dashed line 156, are both down. The effect of this breakdown spreads to other devices, causing the issue of a large number of alarms. Prior art display screens merely display a large number of alarms on a display screen, which makes it difficult for the viewer to locate the source of the abnormality. The screen display device 200, on the other hand, maps those alarms around the source of the abnormality on the display screen, which allows the viewer to more easily infer where the source (center) of an abnormality is, on the display screen. Further, display of alarms on devices and links on the display screen makes it easier for the viewer to infer the extent of obstruction.

Further, in FIG. 10, as to display of states of alarm issue and obstruction in the NW, the screen display device 200 displays a state of alarm issue and obstruction in the NW that is at a time chosen at will by the viewer. For example, as to display of states of alarm issue and obstruction in the NW, the screen display device 200 displays a time-base bar 159 configured to receive an instruction input from the viewer for instructions a state at which time should be displayed, on the display screen so that it displays a state of alarm issue and obstruction in the NW that is at a time chosen by the time-base bar 159, on the three-dimensional display screen. This allows the viewer to see a state of alarm issue and obstruction in the NW that is at a time chosen at will by the viewer, displayed on the three-dimensional display screen, in order to, for example, check back states of alarm issue and obstruction in the NW from the present to the past, which facilitates identifying a device or link that is the source of the obstruction.

Further, as shown in FIG. 11, the screen display device 200 superimposes broken line arrows as flows 157 (flows of packets) on the three-dimensional display screen and also, if a flow 157 is cut off at a point 158 by an obstruction, indicates the point 158 with a mark "x". This allows the viewer to more easily infer where the source of the abnormality is.

[Configuration]

Now, the configuration of the screen display device 200 is described with reference FIG. 12. As described above, the screen display device 200 generates a three-dimensional display screen that displays: the rungs of all devices in a NW and a connection relationship among the devices; information about a location of devices that form a multiple-system group; and states of various kinds of alarms and obstructions. This screen display device 200 is connected with: the devices that form the NW (for example, the transfer devices 121, 122, the control device 141, the upper-level service device 161, and the lower-level service devices 101-103, shown FIG. 9), and receives, from those devices, NW information on alarms and flow rates. The screen display device 200 is also connected with an input device 400 such as a keyboard and a mouse via which the screen display device 200 receives various kinds of instruction inputs about a screen display from the viewer. Further, the screen display device 200 is connected with a display device 300 such as a liquid crystal display that performs a screen display. On the basis of the instruction inputs from the input device 400 and information received from each device, the screen display device 200 generates a three-dimensional display screen that displays a NW state, and outputs it to the display device 300. The viewer sees the three-dimensional display screen to check the NW state.

Functionally, the screen display device 200 is divided into a storage part 210, a processing part 220, and an input/output part 230. The storage part 210 stores various kinds of data that the processing part 220 refers to in generating the display screen, including: a connection relationship among the devices that form the NW; and NW information on alarms and flow rates. On the basis of instruction inputs from the input/output part 230, the processing part 220 refers to the various kinds of data stored in the storage part 210; generates a display screen; and displays it on the display device 300 via the input/output part 230. The input/output part 230 receives various kinds of instruction inputs from the input device 400 and outputs to the processing part 220. The input/output part 230 outputs the display screen generated by the processing part 220 to the display device 300, for display thereon.

The input/output part 230 is embodied by a communication interface and an input/output interface for communication with other devices through a NW such as Internet or a LAN (Local Area Network). The processing part 220 is embodied by execution of a program by a CPU (Central Processing Unit) of the screen display device 200, or by an exclusive circuit or the like. The storage part 210 is embodied by a storage medium such as RAM (Random Access Memory), a ROM (Read Only Memory), a HDD (Hard Disk Drive), or a flash memory. In addition, if the processing part 220 is embodied by program execution, the storage part 210 stores a program to be executed to embody the function of the processing part 220.

The storage part 210 includes a device-information storage section 211, an alarm storage section 212, a flow-rate-information storage section 213, and a setting storage section 214.

The device-information storage section 211 includes a device-attribute-information storage section 2111 and a device-connection-relationship storage section 2112. The device-attribute-information storage section 2111 stores device attribute information (see FIG. 13). The device attribute information is time-series information indicative of: the attribute (rung) of each device in the NW; the coordinates (the latitude and the longitude) of the device on the map; and a device (a multiple-system device), if there is, to be paired with the device to form an active system/backup system pair. In FIG. 13 as an example, the device attribute information indicates: the device number representing each device (identification information on each device); the device name of the device; the rung thereof; the number for the rung (the rung number); the longitude and the latitude; and the multiple-system device.

Figure 12:
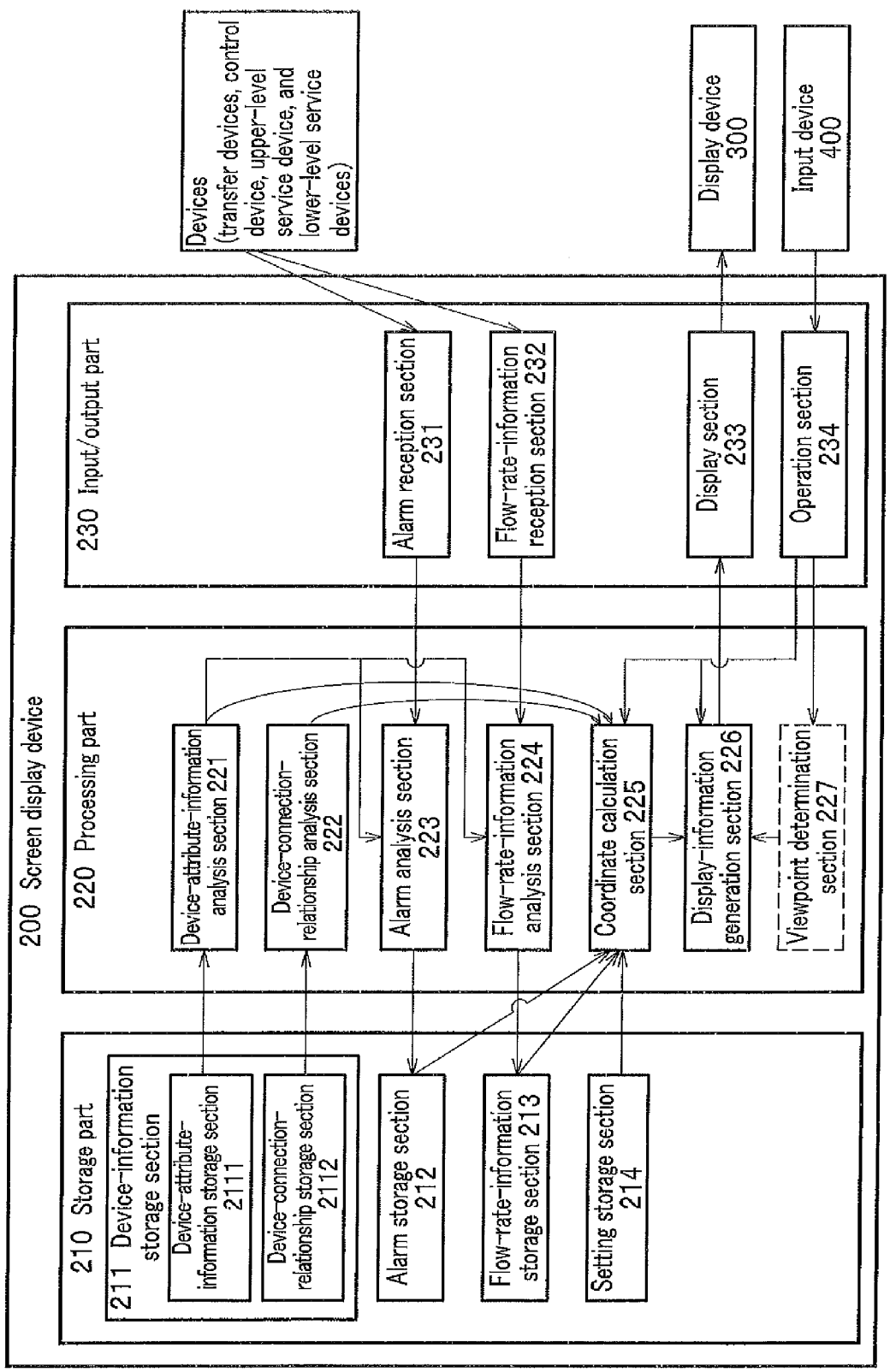
FIG. 12 is a view illustrating an example of the configuration of the screen display device according to the embodiment.

The device-connection-relationship storage section 2112 illustrated in FIG. 12 stores time-series inter-device connection information (see FIG. 13). The inter-device connection information is information indicative of: a connection relationship among the devices in the NW. The inter-device connection information illustrated as an example in FIG. 13 indicates: a link number representing each link; a device number representing each device; a device name thereof; a device number representing a device linked to the device; and a device name thereof. The inter-device connection information may include: physical link information (connection relationship information 1); link information on the control plane (connection relationship information 2); and link information on the service plane (connection relationship information 3), as illustrated in FIG. 13.

The alarm storage section 212 illustrated in FIG. 12 stores time-series alarm information to be displayed respectively on devices and links in the NW. The alarm information is created by an alarm analysis section 223 (described below).

The flow-rate-information storage section 213 stores time-series analyzed flow information. The analyzed flow information is information indicative of which devices each flow passes and is created by a flow-rate-information analysis section 224 (described below).

The setting storage section 214 stores setting information. The setting information is information indicative of: the rung of each device; and the coordinate on the z axis (the height) of the rung on the display screen. For example, as shown in FIG. 13, the setting information includes: attribute-level setting information; and level-coordinate setting information. The attribute-level setting information is indicative of: the rung of each device; and the displayed level of the rung. The level-coordinate setting information is indicative of: the coordinate defining the height of each displayed level. In the setting information, the closer to a terminal of the network the attribute of a device is, the smaller a value is assumed by the coordinate defining the height of the device. In addition, critical-building information illustrated in FIG. 13 is information that the processing part 220 shown in FIG. 12 refers to in displaying a cube used as a mark to show a height of the critical building 155 at an area where a device is on a rung above the lowermost rung (see FIG. 9), on the display screen.

Now, the processing part 220 is described. The processing part 220 includes: a device-attribute-information analysis section 221; a device-connection-relationship analysis section 222; the alarm analysis section 223; the flow-rate-information analysis section 224; a coordinate calculation section 225; and a display-information generation section 226. A viewpoint determination section 227 indicated by the broken line may be provided (see a description below) or may not be provided.

The device-attribute-information analysis section 221 reads, from the device-attribute-information storage section 2111, device attribute information that corresponds to a time selectively input via the input/output part 230 by means of the time-base bar 159 or the like displayed on the display screen (a display time) (see FIG. 10).

The device-connection-relationship analysis section 222 reads inter-device connection information that corresponds to the time selectively input via the input/output part 230 by means of the time-base bar 159 and combines all together the pieces of inter-device connection information between two devices to obtain the whole NW inter-device connection structure.

The alarm analysis section 223 acquires alarms via an alarm reception section 231 (described below) from devices in the NW, creates alarm information in which a link and/or a device targeted for each alarm is related with a time at which the alarm has been issued, and stores the alarm information in the alarm storage section 212.

The flow-rate-information analysis section 224 receives pieces of passing-flow information via a flow-rate-information reception section 232 (described below) from the devices in the NW. The flow-rate-information analysis section 224 combines all together the pieces of passing-flow information received, to determine which devices each of flows has passed, and create analyzed flow information in which the devices which each flow has passed are related with times of reception of the respective pieces of passing-flow information. The flow-rate-information analysis section 224 stores the created analyzed flow information into the flow-rate-information storage section 213.

The coordinate calculation section 225 acquires various kinds of information that correspond to the time selectively input via the input/output part 230 by means of the time-base bar 159, whereby the coordinate calculation section 225 determines the coordinates of the devices, links, flows, and of the like, on a three-dimensional display screen. The coordinate calculation section 225 is described below in greater detail.

On the basis of the coordinate data output from the coordinate calculation section 225, the display-information generation section 226 generates a three-dimensional display screen in which devices, links between the devices, flows that pass the links, and alarm information on the devices and links are superimposed and arranged, and outputs the three-dimensional display screen to the input/output part 230.

The input/output part 230 controls input/output interfaces with the display device 300, the input device 400, and each device in the NW. The input/output part 230 includes the alarm reception section 231, the flow-rate-information reception section 232, a display section 233, and an operation section 234.

The alarm reception section 231 receives alarm information from devices in the NW, and outputs the received alarm information to the alarm analysis section 223.

The flow-rate-information reception section 232 receives passing-flow information from devices in the NW, and outputs the received passing-flow information to the flow-rate-information analysis section 224.

The display section 233 outputs the three-dimensional display screen generated by the display-information generation section 226 to the display device 300.

The operation section 234 outputs information input via the input device 400 to the coordinate calculation section 225.

Now, the coordinate calculation section 225 is described in greater detail. The coordinate calculation section 225: acquires the device attribute information (see FIG. 13) from the device-attribute-information analysis section 221; acquires the inter-device connection information (see FIG. 13) from the device-connection-relationship analysis section 222; and acquires setting information (see FIG. 13) from the setting storage section 214. The coordinate calculation section 225 acquires alarm information that is related to devices and links, from the alarm storage section 212, and acquires analyzed flow information from the flow-rate-information storage section 213.

Then, the coordinate calculation section 225 refers to the inter-device connection information, based on which the coordinate calculation section 225 determines devices and links between the devices that are at the time chosen. Further, the coordinate calculation section 225 refers to the device attribute information (see FIG. 13) and the setting information (see FIG. 13), based on which the coordinate calculation section 225 determines the coordinates, on the x and y axes on the three-dimensional display screen, of each of the devices and links between the devices, as well as the coordinate on the z axis that corresponds to each of the rungs to which the devices belong. Further, the coordinate calculation section 225 refers to the device attribute information (see FIG. 13), based on which, if it determines that there is a device that forms with a given device an active system/backup system pair, the coordinate calculation section 225 places these devices on the three-dimensional display screen, together with an indication that shows that the devices form the pair. For example, as shown in an example of a display screen of FIG. 10, an ellipse 154 is drawn enclosing the devices that form the pair. Further, the coordinate calculation section 225 makes adjustments in placement to reduce crossing of links between devices and lying of one device on another on each level on the three-dimensional display screen.

Moreover, the coordinate calculation section 225 refers to the alarm information, based on which, if it determines that there is an alarm or alarms that correspond to the display time chosen, the coordinate calculation section 225 places the alarm near a device or link targeted for the alarm, as shown in FIG. 10. Further, the coordinate calculation section 225 refers to the analyzed flow information, based on which the coordinate calculation section 225 places flows 157, that correspond to the display time chosen, on a link or links on the three-dimensional display screen that each of the flows 157 passes, as shown in FIG. 11. Then, the coordinate calculation section 225 outputs, to the display-information generation section 226, data of the three-dimensional display screen on which the devices, links, flows, and alarm information are superimposed and arranged (coordinate data). On the basis of this coordinate data, the display-information generation section 226 generates a three-dimensional display screen as illustrated as examples in FIG. 10 and FIG. 11.

[Processing Steps]

Now, the processing steps of the screen display device 200 is described with reference to FIGS. 12-14.

Figure 14:
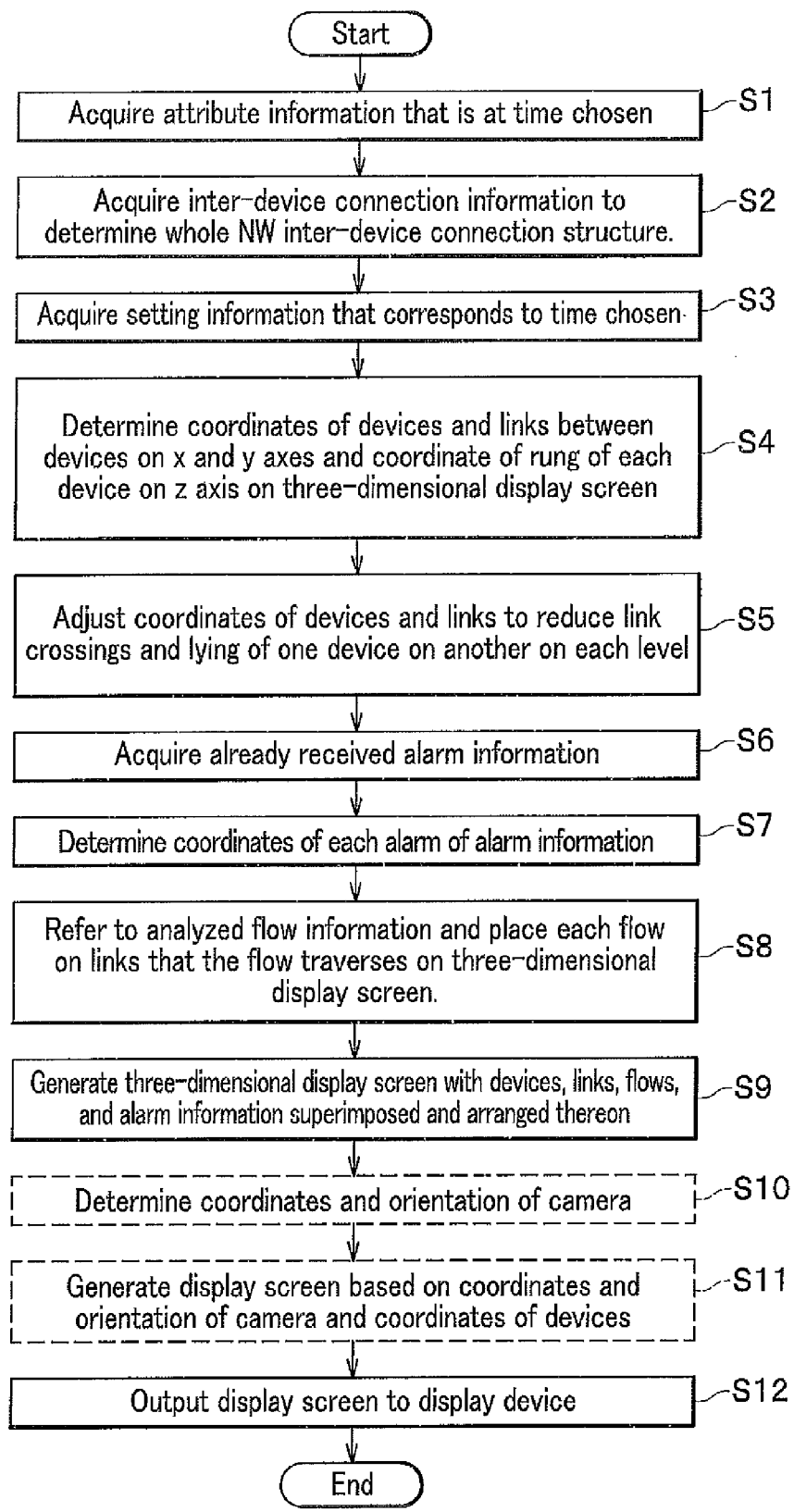
FIG. 14 is a view illustrating processing steps of the screen display device of FIG. 12.

When the operation section 234 of the screen display device 200 of FIG. 12 receives the selective input of a time from the input device 400 via the time-base bar 159 or the like displayed on the display screen (see FIG. 10), the device-attribute-information analysis section 221 acquires, from the device-attribute-information storage section 2111, attribute information that corresponds to the time chosen (see step S1 in FIG. 14). The attribute information shows the attribute (rung) of each device and the coordinates on the x and y axes thereof.

The device-connection-relationship analysis section 222 acquires, from the device-connection-relationship storage section 2112, inter-device connection information that corresponds to the time chosen (see FIG. 13), to determine the whole NW inter-device connection structure (step S2).

Further, the coordinate calculation section 225 acquires, from the setting storage section 214, setting information that corresponds to the time chosen (step S3). The setting information shows the coordinate on the z axis of the rung of each device.

Next, the coordinate calculation section 225 refers to: the device attribute information acquired in step S1; the inter-device connection structure determined in step S2; and the setting information acquired in step S3, and thereby determines the coordinates, on the x and y axes on the three-dimensional display screen, of each of the devices and links between the devices, as well as the coordinate on the z axis that corresponds to each of the rungs to which the devices belong (step S4). At this time, the coordinate calculation section 225 refers to the device attribute information (see FIG. 13), based on which, if it determines that there is a device (devices) that forms together with a given device (devices) an active system/backup system pair (pairs), the coordinate calculation section 225 places an indication (such as an ellipse 154) enclosing the devices that form the pair, on the three-dimensional display screen (see FIG. 9). Further, if it is intended that a mark such as one for a building is placed at an area where devices are on multiple rungs, the coordinate calculation section 225 refers to building information that is included in the setting information (see FIG. 13), and places a mark such as one for a critical building 155 (cube) on the three-dimensional display screen (see FIG. 9).

Further, the coordinate calculation section 225 adjusts the coordinates of devices and links to reduce crossing of links between devices and lying of one device on another on each of levels on the three-dimensional display screen (step S5).

The alarm analysis section 223 acquires alarms that have already been received by the alarm reception section 231 (step S6). Then, the alarm analysis section 223 acquires, from the device-attribute-information analysis section 221, the device attribute information (see FIG. 13), to determine devices and links targeted for the alarms. Next, the alarm analysis section 223 creates alarm information in which the devices and links targeted for the alarms are related to times of issue of the respective alarms, and outputs the created alarm information to the alarm storage section 212. This allows the alarm storage section 212 to store the latest alarm information.

Of the alarm information stored in the alarm storage section 212, the coordinate calculation section 225 refers to alarm information that corresponds to the time chosen in step S1, as well as to the coordinates of each of devices and links as the outcome of the adjustment in step S5, and thereby determines the coordinates on the three-dimensional display screen of each alarm contained in the alarm information (step S7).

Further, of the analyzed flow information stored in the flow-rate-information storage section 213, the coordinate calculation section 225 refers to one that corresponds to the time chosen in step S1, and places flows on links that the flows pass on the three-dimensional display screen (step S8). Then, the coordinate calculation section 225 outputs, to the display-information generation section 226, data of the three-dimensional display screen on which the devices, links, flows, and alarm information are superimposed and arranged (coordinate data).

On the basis of this coordinate data, the display-information generation section 226 generates a three-dimensional display screen on which the devices, links, flows, and alarm information are superimposed and arranged (step S9), and outputs the generated three-dimensional display screen to the display device 300 (step S12).

For steps S10 and S11 indicated by the broken line, these steps may be carried out (see a description below) or may not be carried out.

Thus the display device 300 displays a three-dimensional display screen on which the devices placed on the multiple rungs, the devices that form an active system/backup system pair, the flows, the alarm information, and the like are shown. According to such a display screen, the screen viewer can more easily grasp obstruction points and the source of obstruction in the NW, rungs, the extent of obstruction, and the like.

[Narrowing of Information]

Further, the display-information generation section 226 of the screen display device 200 of FIG. 12 may be configured to narrow information to be displayed on a three-dimensional display screen, on the basis of an instruction input that is made via the input device 400. For example, as shown in FIG. 15, the display-information generation section 226 may display only items on control and service (in FIG. 15, devices and links) and hide links between devices and transfer devices, on the screen, on the basis of the instruction input.

[Viewpoint Shifting]

Moreover, in generation of a three-dimensional display screen, the screen display device 200 may be configured to receive a selective input to determine a three-dimensional display screen to be viewed from which viewpoint and from which direction should be generated. In other words, the screen display device 200 may allow the discretion to be taken to choose a viewpoint and a viewpoint orientation (hereinafter referred to both together as a "viewpoint"). For example, the screen display device 200 may convert a three-dimensional display screen shown in FIG. 16A to display a display screen viewed from viewpoint 1 (vertical viewpoint) or viewpoint 2 (horizontal viewpoint) (see FIG. 16B or FIG. 16C) on the basis of a selective input made by the screen viewer.

In such a case, the screen display device 200 further includes a viewpoint determination section 227 illustrated in FIG. 12. After the processing in step S9 illustrated in FIG. 14, upon receipt of a selective input of a viewpoint via the operation section 234, the viewpoint determination section 227 determines the coordinates and orientation of a camera relative to the three-dimensional display screen according to the viewpoint (step S10). Then the viewpoint determination section 227 outputs the coordinates of the camera to the display-information generation section 226. After that, the display-information generation section 226 generates a display screen on the basis of: the coordinates and the orientation of the camera; and the coordinates of the devices that are determined by the coordinate calculation section 225 (step S11). In other words, the coordinate calculation section 225 converts the three-dimensional display screen generated in step S9 to generate a display screen viewed from the viewpoint chosen in step S10. Then the display-information generation section 226 outputs the generated display screen to the display section 233 (step S12).

Figure 16A:
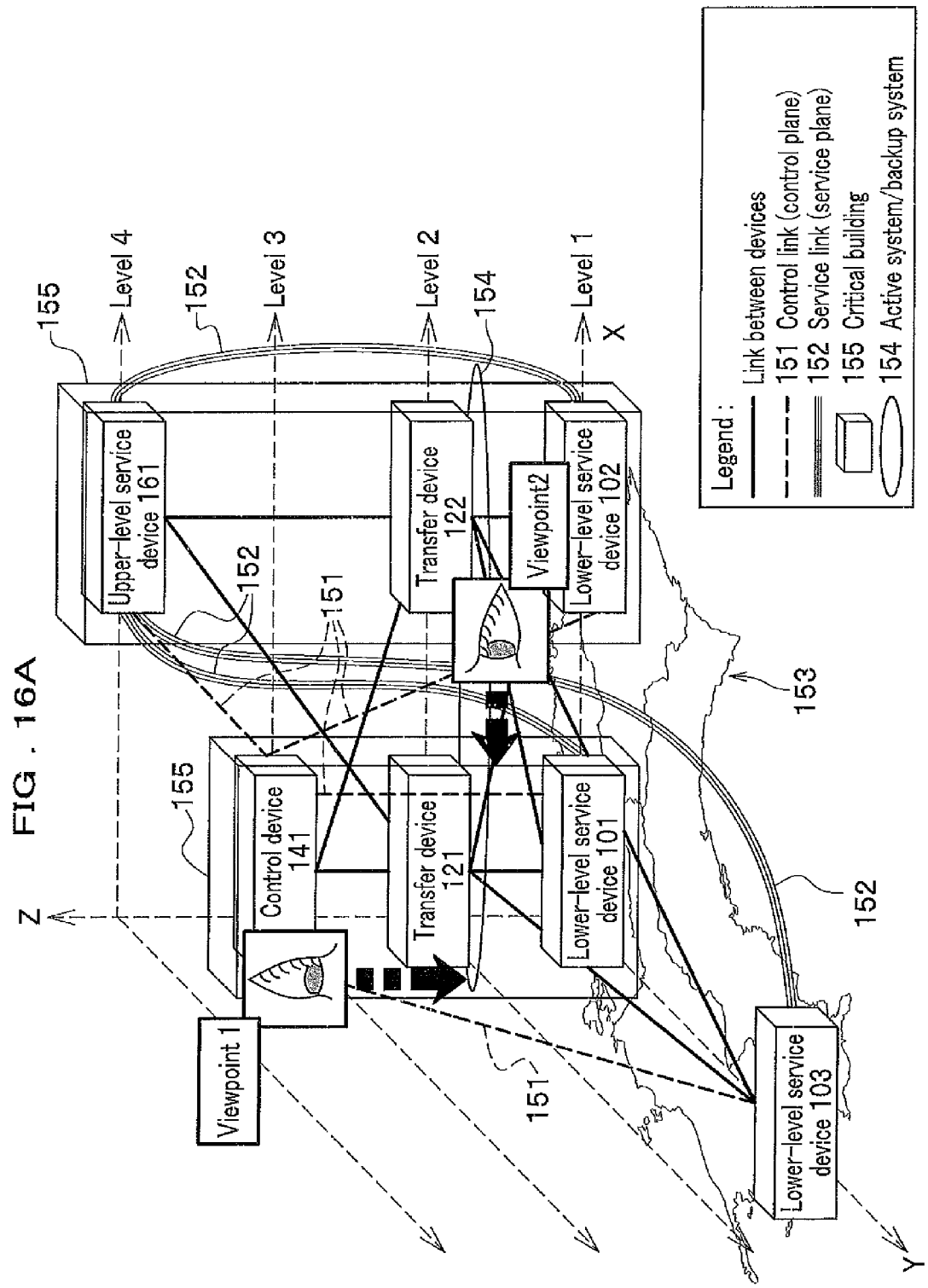
FIG. 16A is a view illustrating an example of a display screen with a viewpoint and a viewpoint orientation set in a screen display according to the embodiment.
Figure 16B:
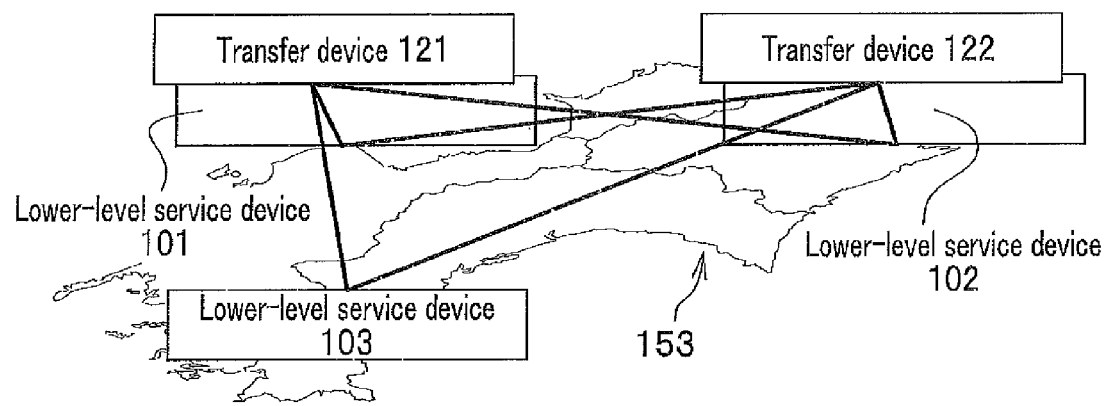
FIG. 16B is a view illustrating an example of a display screen viewed from viewpoint 1 shown in FIG. 16A.
Figure 16C:
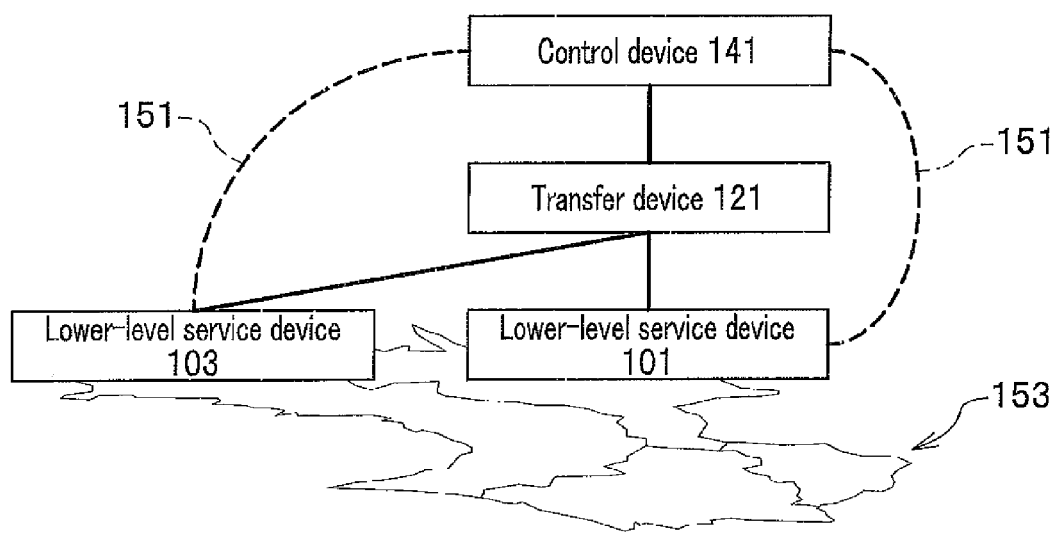
FIG. 16C is a view illustrating an example of a display screen viewed from viewpoint 2 shown in FIG. 16A.
Figure 17A:
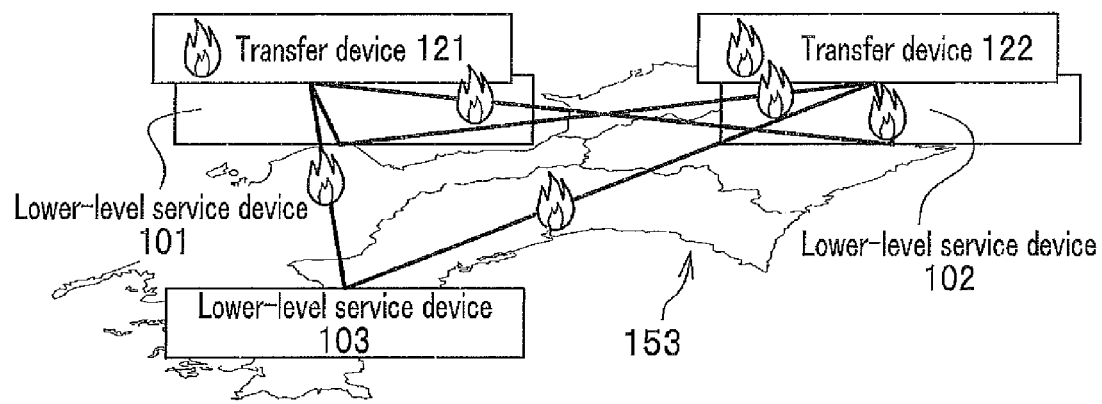
FIG. 17A is a view illustrating an example of a display screen with alarms also shown on the display screen of FIG. 16B.
Figure 17B:
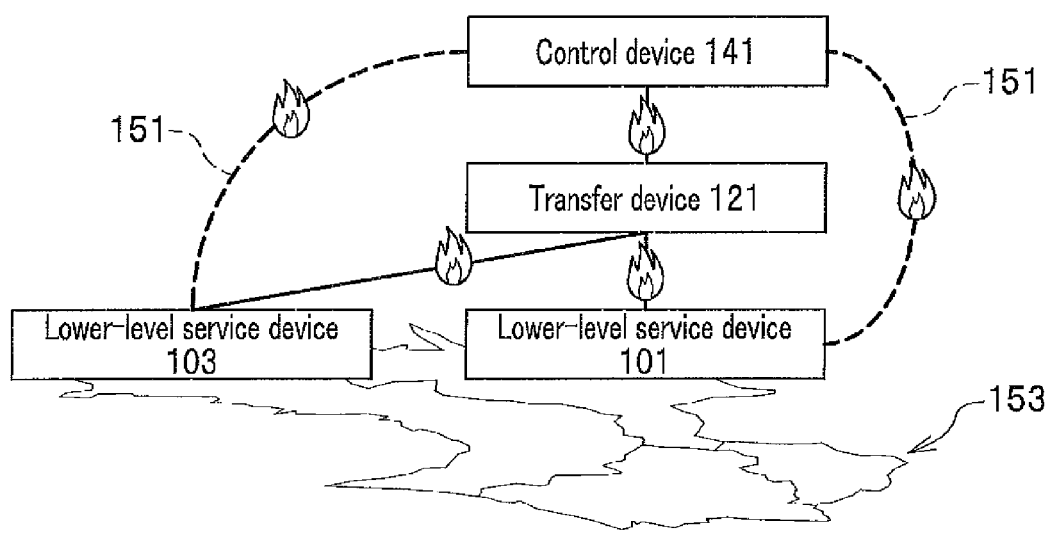
FIG. 17B is a view illustrating an example of a display screen with the alarms also shown on the display screen of FIG. 16C.

For example, if the viewpoint 1 is chosen on the three-dimensional display screen illustrated in FIG. 16A, a view from the vertical viewpoint (a plan view) as shown in FIG. 16B is yielded while if the viewpoint 2 is chosen, a view from the horizontal viewpoint (an elevational view) as shown in FIG. 16C is yielded. After that, the display-information generation section 226 adds alarm displays to the display screens from viewpoints 1 and 2 to generate display screens as illustrated in FIGS. 17A and 17B.

Further, on the basis of an instruction input made by the viewer, the display-information generation section 226 may generate a display screen on which information is narrowed to only a part of devices and links in the NW. For example, the display-information generation section 226 may generate a display screen the information on which is narrowed to the devices and links on the service plane as shown in FIG. 17C. This allows the screen viewer to more readily check a state of only a part of devices and links in the NW so that the viewer can more easily infer the source of obstruction and the extent of obstruction, on the display screen.

[How to Display Alarms]

Figure 18:
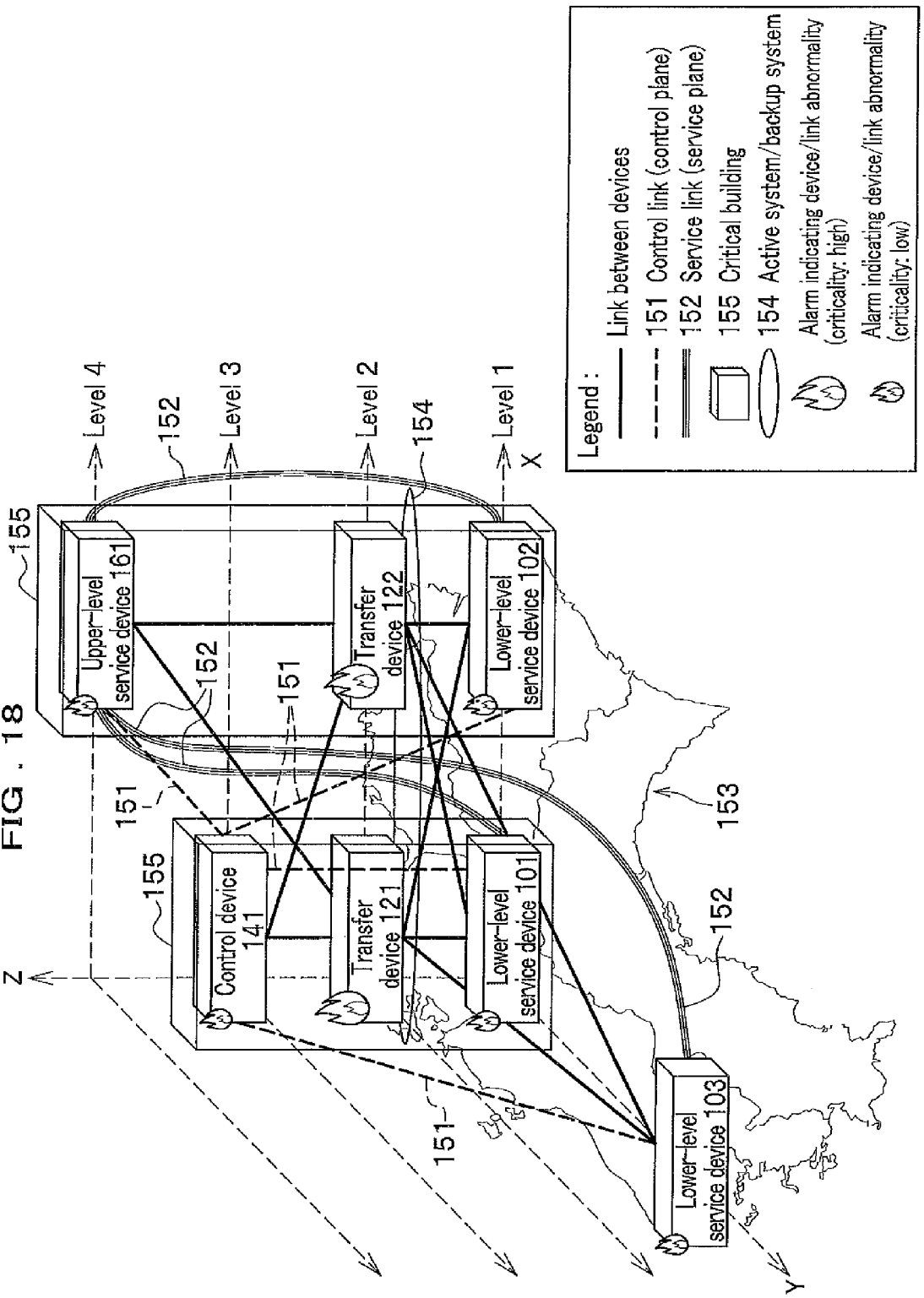
FIG. 18 is a view illustrating an example of a display screen when an obstruction occurs according to the embodiment.

Moreover, the display-information generation section 226 may be configured to generate a display screen with various display colors, sizes, etc., of alarms according to the kind of the alarm on the display screen so that the screen viewer can more easily identify critical obstruction points. For example, the display-information generation section 226 may be configured to enable discrimination between alarms with a high criticality and alarms with a low criticality by the alarm icon size as shown in FIG. 18. Moreover, the display-information generation section 226 may be configured to flash light to indicate alarms that are issued within a most recent predetermined period of time. This allows the screen viewer to more easily recognize changes in a NW state, on the display screen.

[Playback Display]

Further, the screen display device 200 may be configured to display sequentially NW obstruction state changes from a time in the past chosen by the screen viewer through the present time. In other words, the screen display device 200 may be configured to display the playback of the NW states from the past through the present.

Figure 19A:
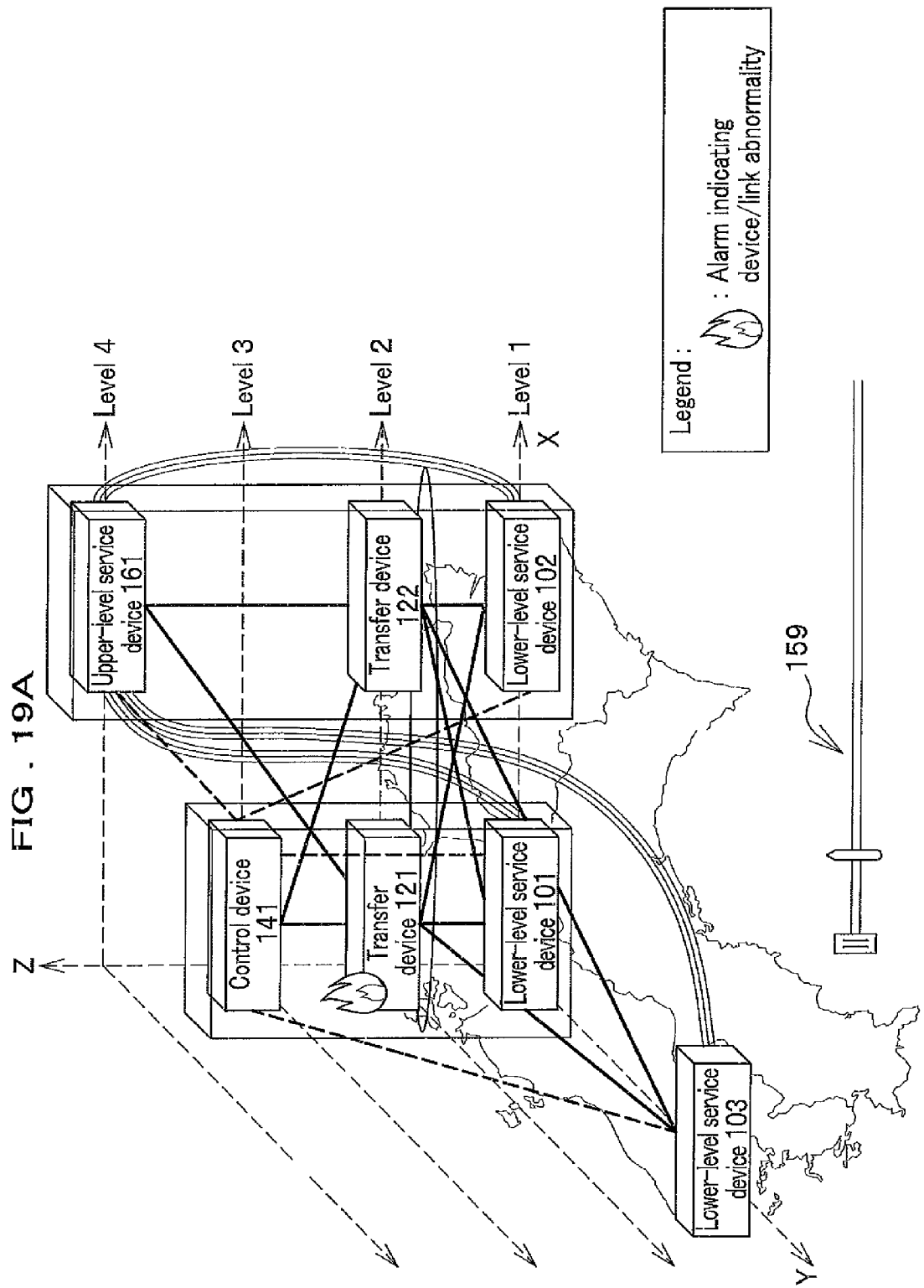
FIG. 19A is a view illustrating an example of a display screen that displays a state in the past chosen by a time-base bar.

For example in an example of an obstruction illustrated in FIGS. 19A-19C, assume that the obstruction occurs to the transfer device 121 in the NW, then spreads to the transfer device 122, which causes the issue of alarms for the links in the whole NW. In this case the display-information generation section 226 of FIG. 12 generates three-dimensional display screens representing the NW states from a time in the past chosen by the viewer via the time-base bar 159 displayed on the display screen through the present. Then the display-information generation section 226 displays these three-dimensional display screens sequentially via the display section 233, on the display device 300. For example, the time-base bar 159 is shifted to the left on a screen which shows the current state illustrated in FIG. 19C to choose a time, according to which the display-information generation section 226 displays a screen which shows a state in the past illustrated in FIG. 19A, followed by displaying a screen which shows the next state in the past illustrated in FIG. 19C, then returning to the screen which shows the current state illustrated in FIG. 19C. This allows the viewer to more easily understand which device in the NW is the cause of the obstruction issuing the first alarm, as well as states of alarm issue and obstruction, by checking in time sequence on the display screen.

Note that although in the above-described embodiment, a mark such as one for critical building 155 is shown to facilitate understanding of the rungs of the individual devices on the three-dimensional display screen, the invention is not limited to this configuration. For example, the screen display device 200 may be configured to display the z axis, out of the x, y, and z axes, or display lines etc., that indicate the rungs (levels), on the three-dimensional display screen.

DESCRIPTION OF REFERENCE NUMERALS 200 screen display device
210 storage part
211 device-information storage section
212 alarm storage section
213 flow-rate-information storage section
214 setting storage section
220 processing part
221 device-attribute-information analysis section
222 device-connection-relationship analysis section
223 alarm analysis section
224 flow-rate-information analysis section
225 coordinate calculation section
226 display-information generation section
227 viewpoint determination section
230 input/output part
231 alarm reception section
232 flow-rate-information reception section
233 display section
234 operation section
300 display device
400 input device 2111 device-attribute-information storage section
2112 device-connection-relationship storage section

The invention claimed is:

1. A screen display device configured to generate a screen that shows a state of a network, comprising:
a storage part, which may be implemented by a storage medium such as a RAM (Random Access Memory), a ROM (Read Only Memory), a HDD (Hard Disk Drive), may store:
(1) device attribute information indicative of:
information indicative of which one of attributes is an attribute of each of a plurality of devices that form the network, the attributes being: a terminal device of the network; an upper-level service device; a transfer device; and a control device, the upper-level service device, which may be implemented by a server device, that may transmit to and receive from the terminal device various kinds of data, the transfer device, which perform data transfer between devices, that may transfer the data between the upper-level service device and the terminal device, and the control device, which may controls devices such as the transfer devices and terminal devices, that may control the transfer device and the terminal device;
coordinates of the device on a map; and,
if the device as a first device and a second device which is another one of the plurality of devices form a pair of an active system/backup system, the second device,
(2) inter-device connection information indicative of a connection relationship among the plurality of devices,
(3) setting information indicative of: a rung corresponding to each attribute; and a coordinate defining a height of a device belonging to each rung relative to a three-dimensional display screen,
(4) analyzed flow information indicative of devices traversed by each of a plurality of flows of the network,
(5) alarm information indicative of alarms to be displayed respectively on devices of the network and links between the devices, each item of the information (1)-(5) being stored together with its time information, and
(6) a program to be executed to embody the function of a processing part;
an input/output part, which may be implemented by a communication interface and an input/output interface for communication with other devices through the network such as Internet or a LAN (Local Area Network), may receive a selective input of a display time that gives instructions that a network state at which time should be displayed and to output to the display device a three-dimensional display screen displaying the network state, the three-dimensional display screen being generated by the processing part; and
the processing part, which may be implemented by a CPU (Central Processing Unit) or exclusive circuit or the like and may execute the program stored in the storage part, may generate the three-dimensional display screen, the processing part:
referring to the inter-device connection information to determine a connection relationship among the plurality of devices that is at the selectively inputted display time,
referring to the device attribute information and the setting information to determine coordinates of each of the plurality of devices relative to an xy plane and a coordinate thereof relative to a z axis of the three-dimensional display screen that are at the selectively inputted display time, and placing each of the plurality of devices at the determined coordinates of the three-dimensional display screen,
referring to the device attribute information and, if at the selectively inputted display time, there is the second device paired with the device, placing the pair on the three-dimensional display screen together with an indication showing that the devices are a pair,
referring to the alarm information and, if there are devices and links targeted for alarms at the selectively inputted display time, placing the alarms near the devices and links for which the alarms are issued,
referring to the analyzed flow information to determine flows that are at the selectively input display time, and placing each flow on a link of the three-dimensional display screen that is traversed by the flow, and
generating a three-dimensional display screen on which there are superimposed and placed: the plurality of devices; the plurality of links between the plurality of devices; the flows that traverse the links; and the alarm information on the devices and links.

2. The screen display device according to claim 1, wherein the coordinate defining a height of a device belonging to each rung in the setting information is set so that the closer to a terminal of the network the attribute of the device is, the smaller a value is assumed by the coordinate defining the height of the device.

3. The screen display device according to claim 1, wherein the processing part generates time-series three-dimensional display screens spanning from the selectively input display time to a predetermined time and displays sequentially the generated three-dimensional display screens via the input/output part.

4. The screen display device according to claim 1, wherein the processing part generates a three-dimensional display screen in which adjustments are made to reduce crossing of the devices, links, flows, and alarm information placed thereon.

5. The screen display device according to claim 1, wherein when the processing part receives via the input/output part a selective input of a viewpoint and of a direction from which to view the three-dimensional display screen, the processing part generates a three-dimensional display screen viewed from the selected viewpoint and direction.

6. A system comprising: the screen display device as cited in claim 1; and a plurality of devices that form a network configured to transmit to and receive from the screen display device an information source of the alarm information and of the analyzed flow information.

7. A system comprising: the screen display device as cited in claim 2; and a plurality of devices that form a network configured to transmit to and receive from the screen display device an information source of the alarm information and of the analyzed flow information.

8. A system comprising: the screen display device as cited in claim 3; and a plurality of devices that form a network configured to transmit to and receive from the screen display device an information source of the alarm information and of the analyzed flow information.

9. A system comprising: the screen display device as cited in claim 4; and a plurality of devices that form a network configured to transmit to and receive from the screen display device an information source of the alarm information and of the analyzed flow information.

10. A system comprising: the screen display device as cited in claim 5; and a plurality of devices that form a network configured to transmit to and receive from the screen display device an information source of the alarm information and of the analyzed flow information.

11. A screen generation method using a screen display device configured to generate a screen that shows a state of a network, the screen display device comprising:
- a storage part, which may be implemented by a storage medium such as a RAM (Random Access Memory), a ROM (Read Only Memory), a HDD (Hard Disk Drive) may store:

(1) device attribute information indicative of:
- information indicative of which one of attributes is an attribute of each of a plurality of devices that form the network, the attributes being: a terminal device of the network; a upper-level service device; a transfer device; and a control device, the upper-level service device, which may be implemented by a server device, that may transmits to and receive from the terminal device various kinds of data, the transfer device, which perform data transfer between devices, that may transfer the data between the upper-level service device and the terminal device, and the control device, which may controls devices such as the transfer devices and terminal devices, that may control the transfer device and the terminal device;
- coordinates of the device on a map; and,
- if the device as a first device and a second device which is another one of the plurality of devices form a pair of an active system/backup system, the second device, (2) inter-device connection information indicative of a connection relationship among the plurality of devices, (3) setting information indicative of: a rung corresponding to each attribute; and a coordinate defining a height of a device belonging to each rung relative to a three-dimensional display screen, (4) analyzed flow information indicative of devices traversed by each of a plurality of flows of the network, (5) alarm information indicative of alarms issued to be displayed respectively on devices of the network and for links between devices, each item of the information (1)-(5) being stored together with its time information, and (6) a program to be executed to embody the function of a processing part;
- an input/output part, which may be implemented by a communication interface and an input/output interface for communication with other devices through the network such as Internet or a LAN (Local Area Network), may receive a selective input of a display time that gives instructions that a network state at which time should be displayed and to output to the display device a three-dimensional display screen displaying the network state, the three-dimensional display screen being generated by the processing part; and the processing part, which may be implemented by a CPU (Central Processing Unit) or exclusive circuit or the like and may execute the program stored in the storage part, may generate the three-dimensional display screen, the processing part performing:
- a step of referring to the inter-device connection information to determine a connection relationship among the plurality of devices that is at the selectively inputted display time,
- a step of referring to the device attribute information and the setting information to determine coordinates of each of the plurality of devices relative to an xy plane and a coordinate thereof relative to a z axis of the three-dimensional display screen that are at the selectively inputted display time, and placing each of the plurality of devices at the determined coordinates of the three-dimensional display screen,
- a step of referring to the device attribute information and, if at the selectively inputted display time, there is a device to be paired with the device, placing the pair on the three-dimensional display screen together with an indication showing that the devices are a pair,
- a step of referring to the alarm information and, if there are devices and links targeted for alarms at the selectively inputted display time, placing the alarms near the devices and links for which the alarms are issued,
- a step of referring to the analyzed flow information to determine flows that are at the selectively input display time, and placing each flow on a link of the three-dimensional display screen that is traversed by the flow, and
- a step of generating a three-dimensional display screen on which there are superimposed and placed: the plurality of devices; the plurality of links between the plurality of devices; the flows that traverse the links; and the alarm information on the devices and links.

* * * * *